(12) United States Patent
Shaick

(10) Patent No.: US 10,447,942 B1
(45) Date of Patent: Oct. 15, 2019

(54) FLASH CONTROL FOR VIDEO CAPTURE

(71) Applicant: QUALCOMM Incorporated, San Diego, CA (US)

(72) Inventor: Ben Zion Shaick, Zichron Yaacov (IL)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/002,137

(22) Filed: Jun. 7, 2018

(51) Int. Cl.
*H04N 5/235* (2006.01)
*H04N 5/232* (2006.01)
*G06T 5/00* (2006.01)
*G06T 5/50* (2006.01)
*H04N 5/359* (2011.01)

(52) U.S. Cl.
CPC .......... *H04N 5/2354* (2013.01); *G06T 5/005* (2013.01); *G06T 5/50* (2013.01); *H04N 5/2355* (2013.01); *H04N 5/23232* (2013.01); *G06T 2207/30216* (2013.01); *H04N 5/359* (2013.01)

(58) Field of Classification Search
CPC ............... H04N 5/2354; H04N 5/2355; H04N 5/23232; H04N 5/359; G06T 5/50; G06T 5/005; G06T 2207/30216
See application file for complete search history.

(56) References Cited

U.S. PATENT DOCUMENTS

| 7,457,477 | B2 | 11/2008 | Petschnigg et al. |
| 8,224,176 | B1 | 7/2012 | Pillman et al. |
| 8,339,508 | B2 | 12/2012 | Levy |
| 9,030,600 | B2 | 5/2015 | Gao |
| 9,036,977 | B2 | 5/2015 | Patten et al. |
| 9,420,198 | B2 | 8/2016 | Cote et al. |
| 2007/0201853 | A1* | 8/2007 | Petschnigg .......... H04N 5/2354 396/155 |
| 2012/0188403 | A1* | 7/2012 | Gomita ................ H04N 5/2351 348/226.1 |
| 2012/0268649 | A1* | 10/2012 | Kurokawa ......... H04N 5/23245 348/370 |
| 2015/0358520 | A1* | 12/2015 | Thimmappa ......... H04N 5/2256 348/217.1 |
| 2017/0094240 | A1* | 3/2017 | Saito .................... H04N 5/2256 |
| 2017/0307869 | A1* | 10/2017 | Zeng .................... H04N 5/2355 |
| 2018/0063409 | A1* | 3/2018 | Rivard ................. H04N 5/2258 |

* cited by examiner

*Primary Examiner* — Jason A Flohre
(74) *Attorney, Agent, or Firm* — Paradice & Li LLP

(57) ABSTRACT

A controller can selectively activate an illumination source. The controller includes a processor in communication with a memory configured to store video frames. The controller is configured to selectively activate an illumination source during capture of two successive video frames in a video capture session, so the illumination source illuminates a scene while a video capture device is capturing one of the successive video frames, and the illumination source does not illuminate the scene while the video capture device is capturing the other of the two successive video frames. The controller can determine whether a difference in image quality between the two successive video frames reaches at least a threshold difference. Based on the determination of whether the difference reaches the threshold difference, the controller can determine whether to activate or deactivate the illumination source while capturing subsequent video frames during the video capture session.

30 Claims, 17 Drawing Sheets

FLASH CONTROL FOR VIDEO CAPTURE

BACKGROUND

Field

This application relates generally to video capture devices and more specifically to video capture devices in communication with an illumination source that illuminates a scene for image or video capture.

Description of Related Art

Various systems and methods have been developed for improving digital flash photographs. One technique intended for low-light imaging attempts to give the end-user the advantages of flash photography without producing a jarring look. The method uses an image pair, where the "flash" illuminates the scene while one image is captured and the flash does not illuminate the scene while the other image is captured. The data from the image pair are combined to remove noise from the ambient-light image, sharpen the ambient-light image using detail from the flash image, correct for color, and remove red-eye.

SUMMARY

According to one aspect, a controller is provided for selectively activating an illumination source. The controller includes a processor in communication with a memory configured to store a sequence of video frames. The controller is configured to selectively activate an illumination source during capture of two successive video frames in a video capture session, so that the illumination source illuminates a scene while a video capture device is capturing one of the successive video frames, and the illumination source does not illuminate the scene while the video capture device is capturing the other of the two successive video frames. The controller can determine whether a difference in image quality between the two successive video frames reaches at least a threshold difference. Based on the determination of whether the difference in image quality reaches the threshold difference, the controller can determine whether to activate or deactivate the illumination source while capturing subsequent video frames during the video capture session.

According to another aspect, a method for controlling activation of an illumination source comprises: selectively activating an illumination source during capture of two successive video frames in a video capture session, so that the illumination source illuminates a scene while one of the successive video frames is captured, and the illumination source does not illuminate the scene while the other of the two successive video frames is captured; determining whether a difference in image quality between the two successive video frames reaches at least a threshold difference; and, based on the determination of whether the difference in image quality reaches the threshold difference, determine whether to activate or deactivate the illumination source while capturing subsequent video frames during the video capture session.

According to one aspect, a controller for an illumination source comprises: means for selectively activating a means for illuminating a scene during capture of two successive video frames, so that the means for illuminating illuminates the scene while one of the successive video frames is captured, and the means for illuminating does not illuminate the scene while the other of the two successive video frames is captured; means for determining whether a difference in image quality between the two successive video frames reaches at least a threshold difference; and means for determining whether to activate or deactivate the means for illuminating a scene while capturing subsequent video frames during a video capture session based on the determination of whether the difference in image quality reaches the threshold difference.

According to another aspect, a non-transitory, machine readable storage medium is encoded with program instructions, such that when accessed and executed by a processor, the instructions cause the processor to perform a method for controlling activation of an illumination source, comprising: selectively operating an illumination source during capture of two successive video frames using a video capture device, so that the illumination source illuminates a scene while one of the successive video frames is captured, and the illumination source does not illuminate the scene while the other of the two successive video frames is captured; determining whether a difference in image quality between the two successive video frames reaches at least a threshold difference; and based on the determination of whether the difference in image quality reaches the threshold difference, determining whether to activate or deactivate the illumination source while capturing subsequent video frames during the video capture session.

DETAILED DESCRIPTION

This description of the exemplary embodiments is intended to be read in connection with the accompanying drawings, which are to be considered part of the entire written description.

An illumination source (or device) used for illuminating (e.g., providing artificial light for a portion of or an entirety of the duration of an image or video preview/capture event) a scene may improve image quality during video capture (i.e., the capture of a sequence of frames of video data). However, use of an illumination source (for the sake of simplicity, referred to herein as a "flash") does not always improve the image quality of a captured scene. As used herein in the context of video capture, the term "image quality" refers to the quality of an individual video frame according to an image quality metric. Under some lighting conditions, use of the flash may overexpose the foreground subject and/or underexpose the background. Using the flash for capturing video shortens battery discharge time, especially if the video capture device captures video with the flash turned ON (i.e., with the flash outputting artificial light in order to illuminate the scene) for a long period (e.g., for the duration of the video capture session).

This disclosure provides a controller that activates and/or deactivates the flash dynamically during, for example, a single, discrete video capture event or session, so the video capture device is configured to primarily activate the flash when the video capture device determines that illumination of the scene, by the flash, would improve the image quality (of individual video frames) of the video capture, and the video capture device is configured to not activate (or deactivate) the flash when the video capture device determines that illumination of the scene, by the flash, would not improve image quality. In some embodiments, the controller is included in a video capture system having a video capture device and a flash.

For example, the controller may dynamically activate (e.g., selectively activate based on a determination by the system) the flash during a given video capture event when the video capture device determines (e.g., detects) a transition from a first illumination level to second, less illuminated level of a scene for capture (e.g., the video capture device moving from a brightly lit room to a darkly lit room), and may dynamically deactivate the flash when the video capture device determines a transition from, for example, a darkly lit room to a brightly lit room. As such, the system can increase battery discharge time while using available battery capacity to capture video frames of optimally illuminated scenes. By gradually changing the flash duty cycle during a transition between ON and OFF states, the method and system enhance a viewer's comfort and enjoyment of the viewing experience during playback.

Figure 1:
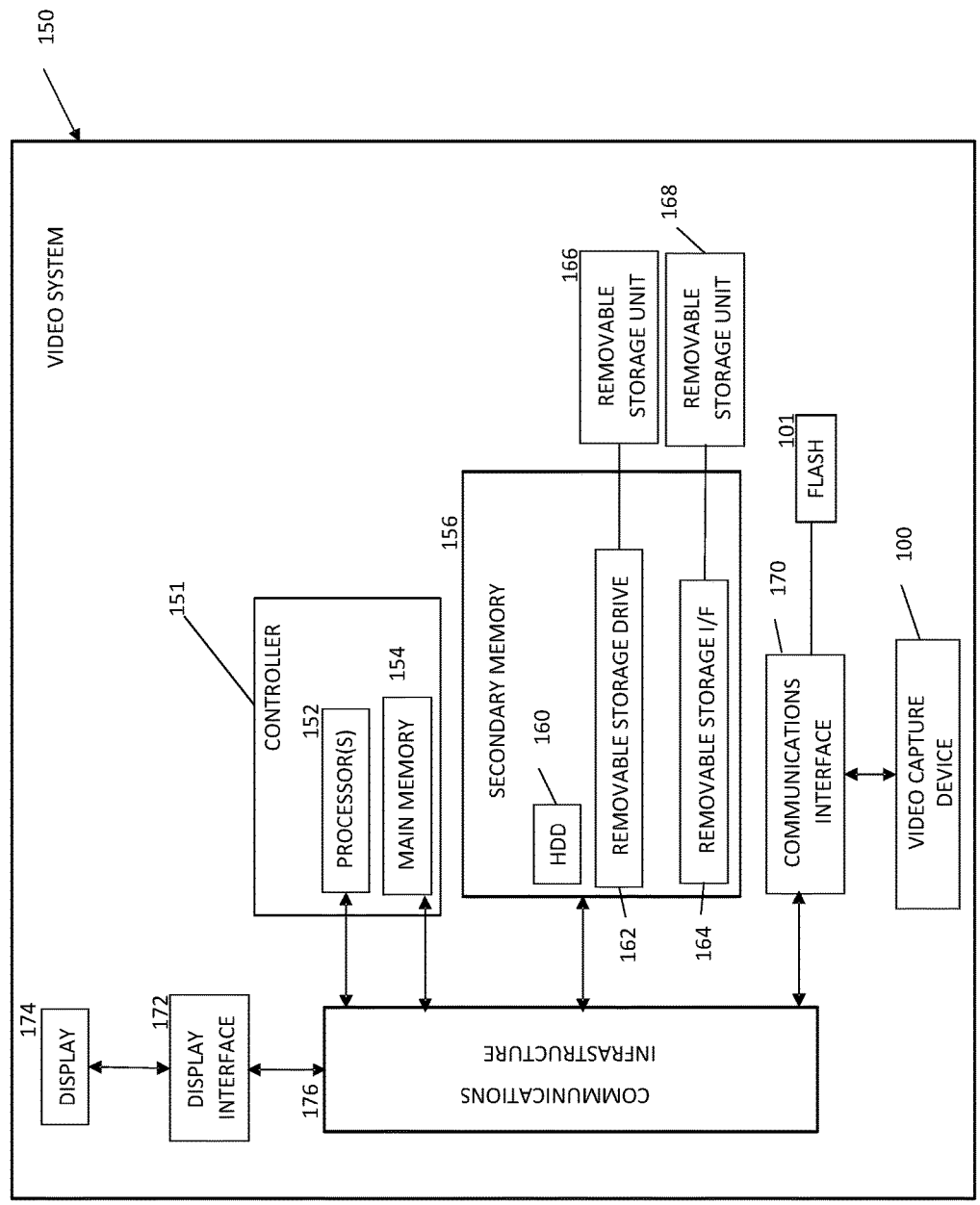
FIG. 1 is a block diagram of a video capture device.

FIG. 1 shows an embodiment of a video system 150 comprising a video capture device 100 capable of capturing video frames at a predetermined frame rate (e.g., 60 frames/second), a flash 101, and a controller 151 which can include one or more processors 152. The controller 151 is configured to selectively operate (e.g., control activation of) the illumination source (e.g., flash 101) during capture of two successive video frames in a video capture session, such that the flash illuminates the scene to be captured during one of the successive video frames, and the flash does not illuminate the scene to be captured during the other video frame of the two successive video frames. The controller 151 is configured to estimate image quality and determine whether a difference in image quality between the two successive video frames (i.e., a first video frame which was captured with the flash illuminating the scene for capture and a second video frame which was captured without the flash illuminating the scene for capture) reaches at least a threshold difference as determined by, for example, the controller 151. Examples of image quality metrics determined by the controller 151 are discussed in the description of FIG. 2.

The controller 151 is configured to initiate capture of additional video frames (e.g., at least two additional video frames) with flash illumination turned ON during capture in response to determining that the difference in image quality between the two successive video frames reaches (or meets) at least the threshold difference. The at least two additional video frames can be successive video frames captured in which the flash illuminates the scene while capturing the two additional video frames, or the additional video frames can be two video frames (in which the flash illuminates the scene while capturing the two additional video frames) separated by a video frame captured while the flash does not illuminate the scene. As used herein, "the flash illuminates the scene" encompasses an event in which the flash illuminates the scene during a fractional part of the capture of the video frame as well as an event in which the flash illuminates the scene throughout capture of the video frame.

In some embodiments, the controller 151 is further configured to initiate capture of at least two further video frames where the flash does not illuminate the scene during capture (of the at least two further additional frames) in response to determining that the difference in image quality between the two successive video frames is less than the threshold difference.

The video system 150 can dynamically (e.g., automatically determine, without receiving and/or requiring user instruction/input) turn the flash ON or OFF during video capture, to reduce use of battery capacity (and increase battery discharge time), in response to (i.e., based on) determining whether illumination of the scene during capture (e.g., by the flash) improves the image quality between successive video frames. In some embodiments, the duration of illumination output by the flash is increased or decreased gradually over the course of capturing multiple frames to avoid sharp transitions between apparent light levels and provide smooth transitions between lighting conditions.

In some embodiments, the system can switch between a multiframe mode of operation (e.g., operation without the flash being used to illuminate the scene when capturing two successive video frames) and a high dynamic range (HDR) mode of operation (e.g., operation in which pairs of successive video frames are captured, where the flash illuminates the scene one frame is captured, and the flash does not illuminate the scene while the other frame is captured). In some embodiments, the flash duration is increased or decreased gradually when transitioning between a multiframe mode and HDR, to enhance the comfort of the subjects.

In various embodiments, the video system 150 provides a means for capturing video frames at a predetermined frame rate (e.g., 60 frames/second). The means for capturing can be a mobile device, such as a cellular phone, a tablet computer, a laptop or desktop computer, a point-and-shoot camera, a digital single lens reflex (DSLR) camera, a digital camcorder, a digital video camera, a drone, a webcam, an Internet Protocol (IP) camera, or the like. In some embodiments a controller dynamically controls the activation and deactivation of the flash during a video capture session. The controller may include a processor and memory configured for storing instructions, video data, and intermediate results. The processor is configured to determine whether activation of the flash to illuminate the scene during a video capture session can improve image quality—based on comparison between a frame of a scene illuminated by the flash and a frame of the same scene without illumination by the flash—and control activation/deactivation of the flash based on the determination.

In some embodiments, the video capture device 100 includes optics (not shown) and an image sensor (not shown). The optics can include one or more lenses and/or mirrors to focus incoming light on the image sensor. When used to capture video, the video system 150 captures a plurality of image frames (referred to herein as "video frames") at a sufficiently high frame rate (e.g., 30 frames/second or 60 frames/second), so that the video frames appear (e.g., provide a viewing experience of the captured video frames to a user of the video system 150) to render and/or display continuous motion to, for example, a user of the video system 150.

FIG. 1 is a block diagram of the video system 150 including the video capture device 100 having a flash 101. Video system 150 has a controller 151, which may include one or more processors 152. Each processor 152 is connected to a communication infrastructure 176 (e.g., a communications bus, cross-over bar, or network). The controller 151 of video system 150 can be implemented as a central processing unit, an embedded processor or microcontroller, or an application-specific integrated circuit (ASIC). The controller 151 can be contained within the housing of the video capture system 150, or the controller 151 can be remotely located and communicatively coupled to the video capture system 150 via the communications interface 170. Video system 150 may include a display interface 172 that forwards graphics, text, and other data from the communication infrastructure 176 (or from a frame buffer, not shown) for display on the display unit 174 to a user.

The one or more processors 152 can include general purpose and/or special purpose processors coupled to the non-transitory, machine readable storage mediums, including the main memory 154 (such as a random access memory, RAM), and a secondary memory 156. The one or more processors 152 are configured with executable instructions. When the processor 152 executes the instructions, the controller 151 controls the video system 150 to perform a method described below.

The main memory 154 and/or the secondary memory 156 can comprise a dynamic random access memory (DRAM). The secondary memory 156 may include, for example, a hard disk drive (HDD) 160 and/or removable storage drive 162, which may represent a solid state memory, an optical disk drive, a flash drive, a magnetic tape drive, or the like. The removable storage drive 162 reads from and/or writes to a removable storage unit 166. Removable storage unit 166 may be a flash memory, optical disk, magnetic disk, floppy disk, magnetic tape, or the like. The removable storage unit 166 may include a computer readable storage medium having tangibly stored therein (or embodied thereon) data and/or computer software instructions, e.g., for causing the processor(s) to perform various operations.

In alternative embodiments, secondary memory 156 may include other devices for allowing computer programs or other instructions to be loaded into video system 150. Secondary memory 156 may include a removable storage unit 168 and a corresponding removable storage interface 164, which may be similar to removable storage drive 162, with its own removable storage unit 166. Examples of such removable storage units include, but are not limited to, universal serial bus (USB) or flash drives, which allow software and data to be transferred from the removable storage unit 166, 168 to video system 150.

Video system 150 may also include a communications interface (e.g., networking interface) 170. Communications interface 170 allows instructions and data to be transferred between video capture device 100 and other elements of video system 150. Communications interface 170 also provides communications with other external devices. Examples of communications interface 170 may include a modem, Ethernet interface, wireless network interface (e.g., radio frequency, IEEE 802.11 interface, Bluetooth interface, or the like), a Personal Computer Memory Card International Association (PCMCIA) slot and card, or the like. Instructions and data transferred via communications interface 170 may be in the form of signals, which may be electronic, electromagnetic, optical, or the like that communications interface 170 is capable of receiving. These signals may be provided to communications interface 170 via a communications path (e.g., channel), which may be implemented using wire, cable, fiber optics, a telephone line, a cellular link, a radio frequency (RF) link and other communication channels.

A means for illuminating a scene for capture of one or more of the video frames can include a flash 101. The means for illuminating can be a flash 101 built into (e.g., fixedly configured within) the video system 150. For example, the video system 150 can be a telephone with an embedded video capture device 100 and flash 101. Alternatively, the means for illuminating can be a pop-up flash. (A pop-up flash is a built-in illumination source available on many digital single lens reflex (DSLR) and point-and-shoot cameras. The pop-up flash can be extended from the camera body during use.) The means for illuminating can also be a detachable flash gun or the like. (A flash gun, also referred to as a speedlight flash, is an illumination accessory configured to mount to the hot shoe of a camera and automatically fire when a frame is captured. A hot shoe is a bracket on top of a camera with electrical contacts for connecting and transmitting control signals from the camera to a flash gun). The means for illuminating can either include a single flash device or a plurality of flash devices. For example, the means for illuminating can have a master flash and may also include a slave flash (now shown). Any of the flash types described above can act as a master flash. If present, the slave flash may be triggered using a sync cord, a radio frequency trigger, or an optical slave trigger. The controller 151 can turn flash 101 ON or OFF during video capture.

Figure 2:
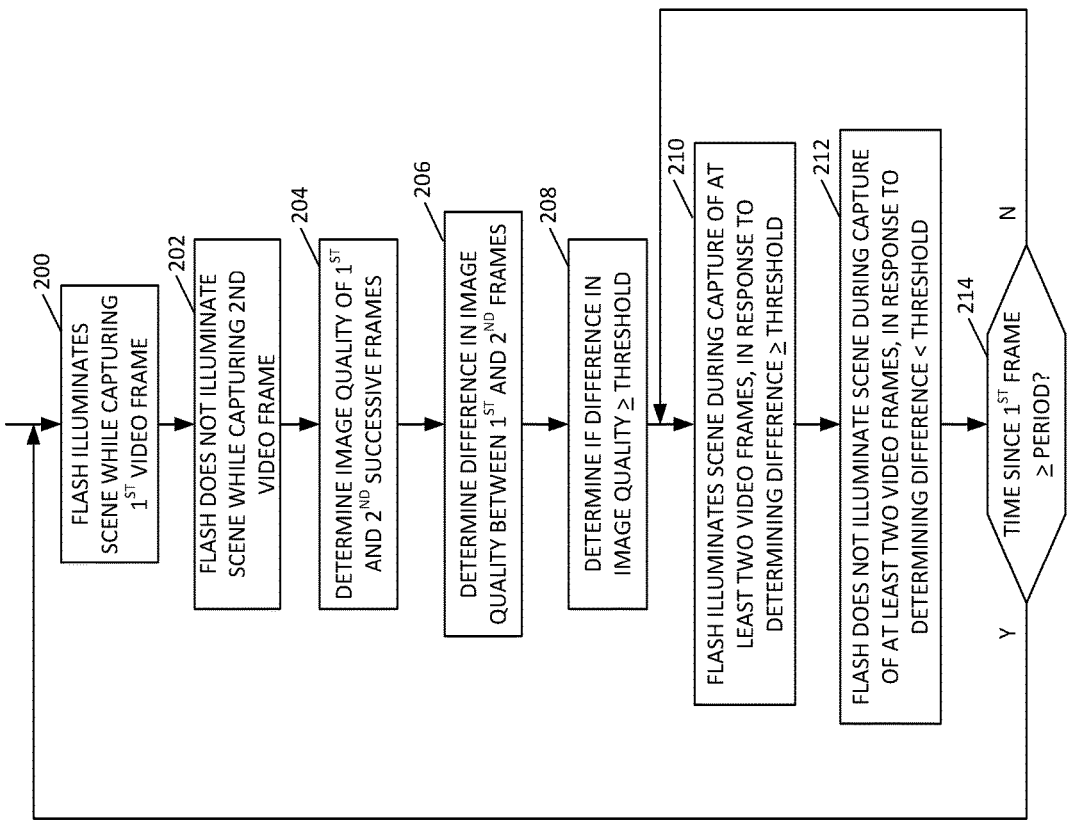
FIG. 2 is a flow chart of a method for controlling a flash during video capture.

FIG. 2 is a flow chart of an example of a control method for controlling activation and deactivation of the flash 101 during video capture, in a video system 150 having a video capture device 100 capable of capturing video frames at a predetermined frame rate (e.g., 60 frames/second), a flash 101, and a controller 151. The controller 151 has a programmable processor programmed with instructions, or a special-purpose processor, configured to implement the method of FIG. 2 and optimize activation and deactivation of the flash 101 during video capture for improved image quality and battery discharge time. The method of FIG. 2 turns the flash ON, when illumination of the scene provides at least a threshold improvement in image quality (over the scene when not illuminated by the flash), and turns the flash OFF when illumination of the scene does not provide at least a threshold improvement in image quality.

The controller 151, programmed with instructions for executing the operations shown in blocks 200 and 202, provides one example of a means for selectively operating (activating/deactivating) the means for illuminating (e.g., flash 101) during capture of two successive video frames during a video capture session using the means for capturing (e.g., video capture device 100), so that the means for illuminating (e.g., flash 101) illuminates the scene during capture of one of the successive video frames, and the means for illuminating does not illuminate the scene during capture of the other of the two successive video frames.

At block 200, the means for selectively operating the means for illuminating causes the video system 150 to selectively activate/deactivate the flash 101 during capture of one out of two successive video frames during a video capture session. At block 200, the flash illuminates the scene while the video capture device 100 captures a first video frame.

At block 202, the means for selectively operating the means for illuminating causes the video system 150 to capture a second video frame, where the flash does not illuminate the scene while capturing the second video frame. Although the captured frame for which the flash illuminates the scene precedes the captured frame for which the flash does not illuminate the scene in this example, in other examples, the captured frame for which the flash does not illuminate the scene is captured before the captured frame for which the flash illuminates the scene.

The controller 151, programmed with instructions for executing the operations shown in Blocks 204 to 208 provides an example of a mechanism (e.g., sub-routine or sub-method) for determining whether a difference in image quality between the two successive video frames reaches at least a threshold difference. At block 204, the controller 151 determines the respective image quality of each of the first and second successive video frames. Any of a variety of automated image quality metrics, determined by the controller 151, can be used (either alone or in combination with one another), including but not limited to spatial frequency response (modulation transfer function), dynamic range, tonal response, contrast, light falloff, and/or the like as being indicative of the quality of images (e.g., the image quality of the first video frame and the second video frame of the successive video frames). The image quality metric can be computed across the entirety of respective video frames at full resolution, or the pixels of each video frame can be subsampled for the image quality computation in order to increase the computation speed.

At block 206, the controller 151 determines a difference in image quality between the two successive video frames (e.g., the difference may be determined by subtracting the image quality value of the first frame of the two successive frames from the image quality value of the second frame of the two successive frames.

At block 208, the controller 151 determines whether the difference (determined at block 206) in image quality between the two successive video frames reaches at least a threshold difference. The threshold difference can be an empirically determined number, selected based on the measure of image quality being used. The size of the threshold can be selected to bias the operation of the flash towards maximizing image quality or towards maximizing battery discharge time. In some embodiments, the video system 150 has a user-operable switch (not shown) for selecting either a high threshold value (for maximizing battery discharge time) or a low threshold value (for activating the flash, even when the improvement in image quality is smaller). In other embodiments, the video system 150 is configured to receive user input/selection on a continuous or gradual scale (for example, in some embodiments, the video system 150 may be configured with a graphical user interface (GUI) that is displayed, allowing the user to select the threshold using a "slider" type control, a microphone to receive an input command from a user, and/or the like). In other embodiments, instead of a switch between two discrete states, the GUI can provide a menu or set of radio buttons, for selecting one of a predetermined set of mutually exclusive threshold values.

The controller 151, programmed with instructions for executing the operations shown in block 210, provides an example of a means for initiating capture of at least two additional video frames using the means for illuminating in response to determining that the difference in image quality between the two successive video frames reaches at least the threshold difference. At block 210, the controller 151 initiates capture of at least two additional video frames where the flash illuminates the scene during capture of the at least two additional video frames, in response to determining that the difference in image quality between the two successive video frames reaches at least the threshold difference. Thus, the flash is turned ON for at least two video frames in the case where the flash improves image quality. The at least two frames (where the flash illuminates the scene while the at least two frames are captured), can be consecutive in some operating modes, or the at least two frames can be separated by a frame captured while the flash does not illuminate the scene, or in another operating mode.

In some embodiments, the at least two frames can include 30 frames or 60 frames, for example. The number of additional video frames captured in block 210 can be selected so as to avoid very frequent changes in flash state (since frequent changes in flash state may be disturbing to the user or the subject). For example, a large number of additional video frames can reduce the frequency of flash state changes. The number of additional frames can be selected so as to avoid noticeable prolonged periods of inadequate lighting. For example, a small number of additional frames may allow the video system 150 to respond more quickly to changes in ambient light level.

The controller 151, programmed with instructions for executing the operations shown in Block 212. provides an example of a means for initiating capture of at least two additional video frames without using the means for illuminating in response to determining that the difference in image quality between the two successive video frames is less than the threshold difference. At block 212, the controller 151 initiates capture of at least two further video frames—where the flash does not illuminate the scene while capturing the at least two further video frames—in response to determining that the difference in image quality between the two successive video frames is less than the threshold difference. In some embodiments, the number of frames captured while the flash does not illuminate the scene in block 212 is the same as the number of frames in block 210.

At block 214, the controller 151 compares the time since the first video frame of the two successive video frames was captured in block 200 to a predetermined period (e.g., 1 second, 15 seconds, 30 seconds or 60 seconds). If the time since the first video frame of the two successive video frames is less than the predetermined period, then block 210 or block 212 is performed (based on whether the difference reaches at least the threshold value).

At block 214, if the time since the first video frame is at least the predetermined period, then control returns to block 200 and blocks 200-214 are repeated. The controller 151 is configured to repeat selectively activating/deactivating the flash 101 during capture of two successive video frames (where the flash illuminates the scene while one video frame is captured and the flash does not illuminate the scene while the other video frame is captured) during a video capture session, determining whether the difference in image quality between the two successive video frames reaches at least a threshold difference, and initiating capture of at least two additional video frames—where the flash illuminates the scene during capture of the at least two additional video frames—in response to determining that the difference in image quality between the two successive video frames reaches at least the threshold difference. After jumping from block 214 to block 200, one or both of blocks 200 and/or 202 may be omitted in certain operating modes and situations, where the two most recent frames captured where the flash illuminates the scene while one frame is captured and the flash does not illuminate the scene while the other frame is captured.

The method of FIG. 2 can be used to dynamically switch between various flash modes, which can include flash ON, flash OFF, multiframe, and/or high dynamic range (HDR), for example. Several examples of dynamic flash control with various combinations of these four modes are described below.

Figure 3:
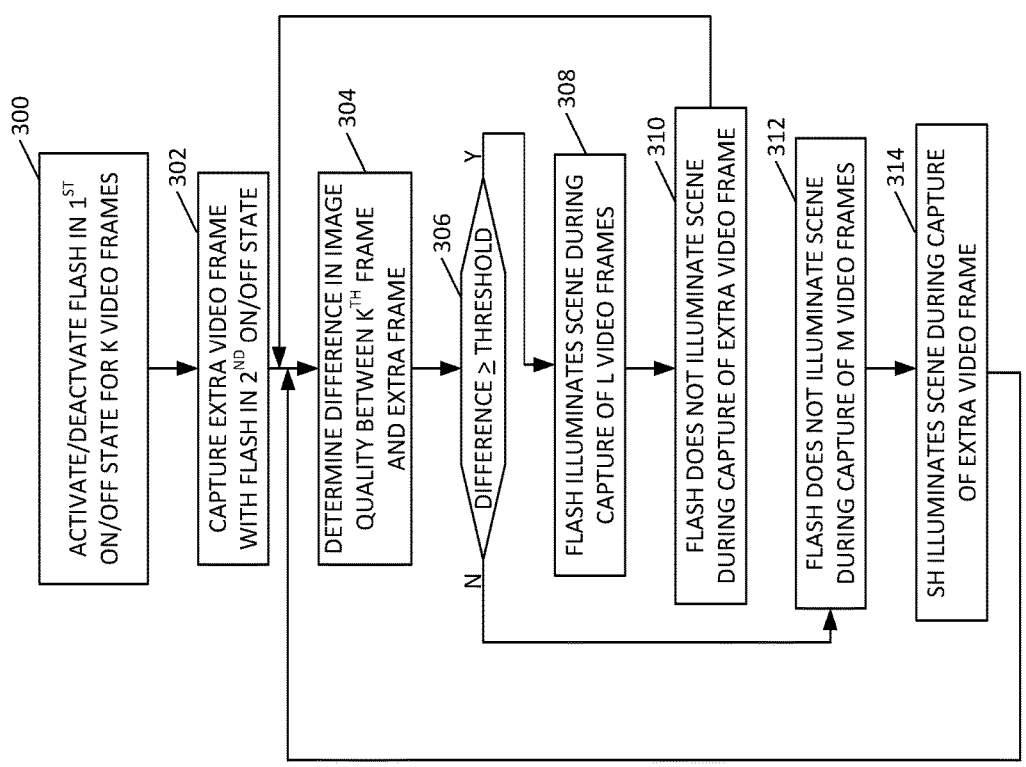
FIG. 3 is a flow chart of a method for dynamically switching between a "flash ON" operating mode and a "flash OFF" operating mode.

FIG. 3 is a flow chart of a method for flash control during video capture, where the controller 151 dynamically switches the flash between ON (illuminating the scene) mode and OFF (not illuminating the scene) mode.

At block 300, the controller 151 of video system 150 operates the flash 101 in a first ON/OFF state (i.e., either ON or OFF) to capture K video frames, where K is an integer greater than or equal to two.

At block 302, the video system 150 operates the flash in the second ON/OFF state (i.e., either OFF or ON) to capture an extra video frame in an opposite ON/OFF state from the first ON/OFF state.

Block 304 provides an example of a means for determining the difference in image quality between a first frame (where the flash illuminates the scene while the first frame is captured) and a second frame (where the flash does not illuminate the scene while the second frame is captured), based on the extra frame and one of the two consecutive video frames. At block 304, the controller 151 computes the image quality of the $K^{th}$ frame (from block 300) and the image quality of the extra frame (from block 302). Based on these values, the controller 151 computes the difference between the image quality of the $K^{th}$ frame and the image quality of the extra frame.

At block 306, the controller 151 determines whether the difference in image quality between the $K^{th}$ video frame and the extra video frame reaches at least a threshold difference. The threshold difference can be an empirically determined number, selected based on the measure of image quality being used. If the difference reaches at least the threshold value, control passes to block 308. If the difference is less than the threshold value, control passes to block 312.

Block 308 provides an example of a means for initiating capture of at least two additional video frames using the means for illuminating in response to determining that the difference in image quality between the two successive video frames reaches at least the threshold difference. At block 308, the video system 150 initiates capture of L video frames (where the flash illuminates the scene during capture of the L video frames), where L is an integer greater than or equal to two. The value of L can be the same as, or different from, the value of K (in blocks 300 and 304). For example, K(in block 300) may be set smaller than L in block 308. The value of K is used at the beginning of the capture, without knowledge of the video quality beforehand, therefore using a value of L (in block 308) larger than the value of K (in blocks 300 and 304) means faster response at the beginning of the capture.

At block 310, the video system 150 initiates capture of an extra video frame, where the flash does not illuminate the scene during capture of the extra video frame. After completing block 310, control jumps to block 304.

Block 312 is an example of a means for initiating capture of at least two further video frames without using the means for illuminating in response to determining that the difference in image quality between the two successive video frames is less than the threshold difference. At block 312, the video system 150 initiates capture of M video frames, (where the flash does not illuminate the scene during capture of the M video frames), where M is an integer greater than or equal to two. The value of M can be the same as, or different from, either or both of the values of K (in blocks 300 and 304) and L (in block 308). For example, setting the value of M (in block 312) to be greater than the value of L (in block 308) is useful for optimizing power consumption, because the flash fires at least once for every determination of the difference (between flash ON and flash OFF modes) at block 304. By increasing the number of frames captured (where the flash does not illuminate the scene during capture) between determinations, additional time till battery discharge may be realized.

The controller 151 is programmed with instructions to execute Block 314 in an example of a means for initiating capture of an extra frame between two consecutive video frames. At block 314, the video system 150 initiates capture of an extra video frame (where the flash illuminates the scene while the extra video frame is captured). After completing block 310, control jumps to block 304.

A few specific examples of the method of FIG. 3 are described below with reference to FIGS. 6-9.

Figure 4:
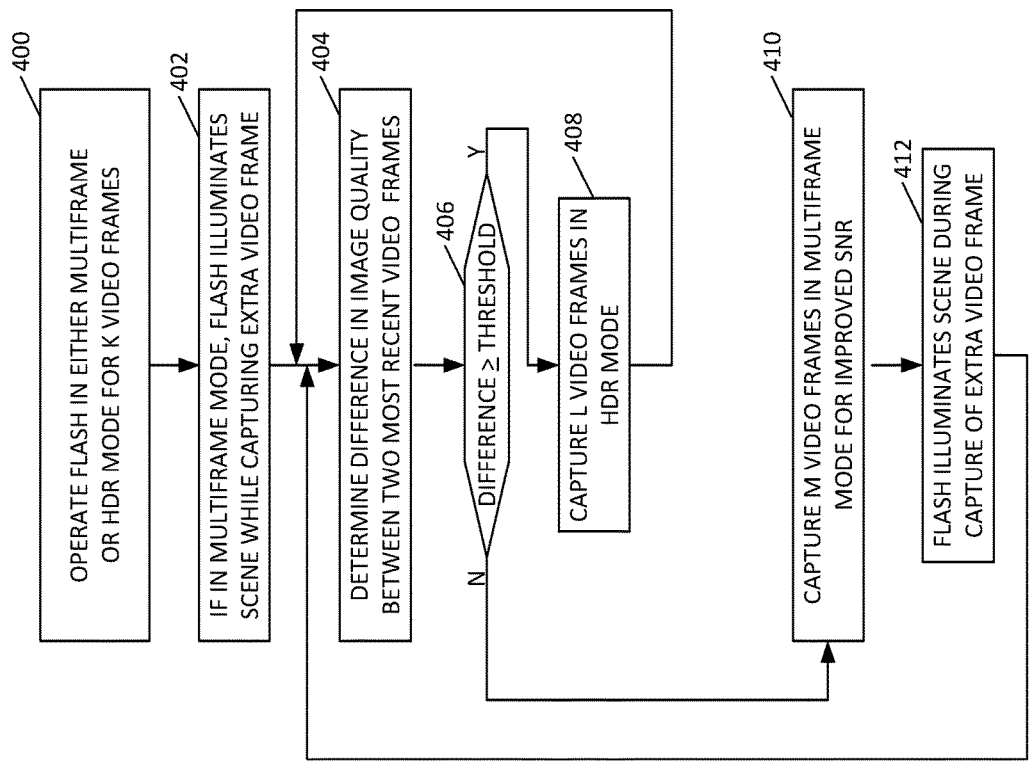
FIG. 4 is a flow chart of a method for dynamically switching between a multiframe operating mode and a high dynamic range (HDR) operating mode.

FIG. 4 is a flow chart of a method for flash control during video capture, where the controller 151 dynamically switches the flash between multiframe mode (block 410) and HDR mode (block 408).

At block 400, the controller 151 causes the video system 150 to operate the flash 101 in either the multiframe mode or the HDR mode while capturing K video frames.

At block 402, if the video system 150 is operating in multiframe mode (flash OFF), the video capture device 100 captures an extra video frame (where the flash illuminates the scene while the extra video frame is captured), for purpose of determining the difference in image quality between two successive frames: where the flash illuminates the scene while one frame is captured and the flash does not illuminate the scene while the other frame is captured. In the case where the video system 150 is operating in HDR mode, the extra video frame is not captured.

The controller 151 is programmed with instructions to execute Blocks 404 and 406 in an example of a means for initiating a change between operating the video capture device in the multiframe mode and operating the video capture device in the HDR mode based on the difference. The controller 151 is programmed with instructions to execute Block 404 in an example of a means for determining the difference in image quality between a first video frame (where the flash illuminates the scene while the first video frame is captured) and the flash does not illuminate the scene while a second video frame is captured, based on the extra frame and one of the two consecutive video frames. At block 404, the controller 151 determines the difference between the two most recent video frames. The difference is determined, based on the extra frame and one of the two consecutive video frames, in the case where the video system 150 is operating in multiframe mode. In the case where the video system 150 is operating in multiframe mode, the difference is determined, based on two consecutive video frames that are used to form a single HDR output frame. (In the case of sensor data collected in multiframe or HDR modes, the terms "output frame" and "video output frame" as used herein refer to a single video frame that is formed by combining data from at least two input video frames to improve SNR, improve image quality, or remove artifacts. The output frame is stored in one of the non-transitory, machine readable storage media 154, 156, 166, 168 (FIG. 1) for subsequent playback.)

At block 406, the controller 151 determines whether the difference reaches at least a threshold value. If the difference reaches at least the threshold value, control passes to block 408. Thus, if the current flash operating mode is multiframe, and the difference reaches at least the threshold value, controller 151 initiates a change between operating the video capture device in the multiframe mode and operating the video capture device in the HDR mode based on the difference. If the difference is less than the threshold value, control passes to block 410. Thus, if the current flash operating mode is HDR, and the difference is less than the threshold value, controller 151 initiates a change between operating the video capture device in the multiframe mode and operating the video capture device in the HDR mode based on the difference.

The controller 151 programmed with instructions to execute Block 408 is an example of a means for operating the video capture device in a high dynamic range (HDR) mode. The controller 151 programmed with instructions to execute Block 408 also provides another example of a means for initiating capture of at least two additional video frames using the means for illuminating in response to determining that the difference in image quality between the two successive video frames reaches at least the threshold difference (where the flash 101 illuminates the scene while two out of every four consecutive frames in HDR mode are captured). At block 408, the controller 151 operates the video system 150 in the HDR mode, alternating between a captured frame for which the flash illuminates the scene and a captured frame for which the flash does not illuminate the scene, until L frames are captured. The value of L can be the same as, or different from, the value of K (in block 400). For example, K(in block 400) may be set smaller than L in block 408. Each pair of successive input video frames is combined to form an HDR output video frame. At the conclusion of block 408, control passes to block 404. Because HDR includes alternating flash ON and flash OFF frames, extra frames are not captured to support the determination of the difference in image quality between the captured frame for which the flash illuminates the scene and the captured frame for which the flash does not illuminate the scene. The next instance of block 404 compares two of the video frames within a pair of input frames already captured to form an HDR output frame.

The controller 151 programmed with instructions to execute Block 410 is an example of a means for initiating capture of at least two further video frames without using the means for illuminating in response to determining that the difference in image quality between the two successive video frames is less than the threshold difference. The controller 151 programmed with instructions to execute Block 410 also provides an examples of a means for operating the video capture device in a multiframe mode. In the multiframe mode, the flash does not illuminate the scene while pairs of successive video frames are captured, and the pair of successive video frames within each pair are combined so as to increase the signal to noise ratio (SNR). (The pixel signal values in successive video frames are strongly correlated with each other and add together, while random noise in the two frames tend to partially cancel each other.) In HDR mode, the processor 152 combines a captured video frame for which the flash illuminates the scene and a captured video frame for which the flash does not illuminate the scene, to provide an HDR video frame with a broader frequency spectrum than either of the individual images. Thus, both multiframe and HDR combine pairs of successive video frames. Operation in multiframe mode does not use flash; Operation in HDR mode uses flash during capture of alternating video frames. The controller 151 programmed with instructions to execute block 410 provides another example of means for operating the video capture device in a multiframe mode. At block 410, the controller 151 operates the video system 150 in a multiframe mode to capture M video frames, while the flash does not illuminate the scene. Each pair of successive input video frames is combined to form a low-noise output video frame. The value of M can be the same as, or different from, either or both of the values of K (in block 400) and L (in block 408). For example, setting the value of M (in block 400) to be greater than the value of L (in block 408) is useful for optimizing power consumption.

The controller 151 programmed with instructions to execute block 412 provides another example of a means for initiating capture of an extra frame between two consecutive video frames. At block 412, the flash illuminates the scene while an extra video frame is captured, and control passes to block 404. The next execution of block 404 compares the extra flash frame with the most recent no-flash frame to support the determination of the difference in image quality between the captured frame for which the flash illuminates the scene and the captured frame for which the flash does not illuminate the scene.

The video system 150 has a period between successive video frames for video capture (e.g., 1/30 second). In some embodiments, the flash illuminates the scene while the extra frame is captured in block 412, in between (e.g., midway between) two frames for which the flash does not illuminate the scene (e.g., 1/60 second after a video frame for which the flash does not illuminate the scene, and 1/60 second before the next video frame for which the flash does not illuminate the scene). The controller 151 is configured to use the extra frame for determining the difference in image quality in block 404, but the extra frame is not used in the video output stream.

In some embodiments, following a determination that changing the flash mode between flash ON mode and flash OFF mode (or between multiframe mode and HDR mode) will improve image quality, some embodiments immediately switch from the current flash mode to the next flash mode. In other embodiments, following a determination that changing the flash mode will improve image quality, the controller 151 gradually transitions the flash operation from the current flash mode to the next flash mode. Since the illumination in a frame—for which the flash illuminates the scene while the frame is captured—is controlled by the length of time the flash fires, gradual transitions between flash modes can be achieved by gradually increasing or decreasing the length of time the flash fires to illuminate the scene while capturing successive video frames.

In some embodiments, the controller 151 is further configured to gradually increase or decrease a flash duration during a transition between operating the video capture device in a first flash mode and operating the video capture device in a second flash mode, as discussed below in the description of FIGS. 14-17.

Figure 5:
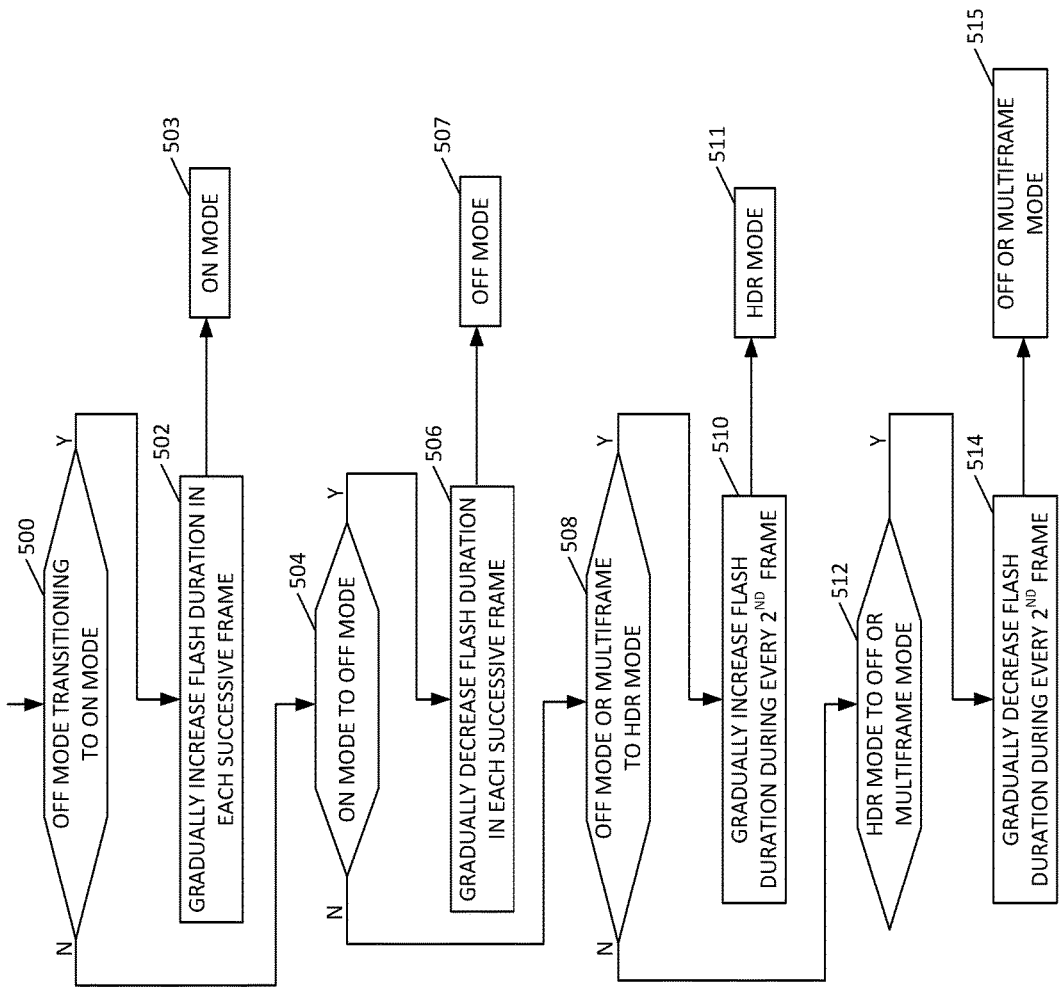
FIG. 5 is a flow chart of a method for gradually transitioning between two of the "flash ON", "flash OFF", multiframe or HDR modes.

FIG. 5 provides a means for gradually increasing or decreasing a flash duration during a transition between operating the video capture device in a first flash mode and operating the video capture device in a second flash mode. In FIG. 5, the first flash mode and the second flash mode include two modes from the group including ON mode, OFF mode, multiframe mode, or HDR mode. FIG. 5 is a flow chart showing how the flash activation/deactivation is controlled to provide gradual transitions between flash modes, for a smoother and less jarring illumination profile over time, to enhance the viewer experience.

In block 500, in the case where the transition is from the OFF mode (in which the flash does not illuminate the scene while the image is captured) to the ON mode (in which the flash illuminates the scene while the image is captured), control passes to block 502. In the case where the transition is not from the OFF mode (in which the flash does not illuminate the scene while the image is captured) to the ON mode (where the flash illuminates the scene while the image is captured), control passes to block 504.

At block 502, the first flash mode includes capturing each video frame, where the flash does not illuminate the scene while capturing the image, and the second flash mode includes capturing each video frame, where the flash illuminates the scene while capturing the image. The controller 151 causes the flash 101 to gradually increase the flash duration in each successive frame. For example, the flash duration in five consecutive frames during the transition may be 0.0001 second, 0.0002 second, 0.0003 second, 0.0004 second and 0.0005 second, respectively. This is only one example. The duration of the transition and the duration of the individual flashes may be varied.

At block 503, after the completion of the transition, the video capture device operates in the flash ON mode (capture in which the flash illuminates the scene while the image is captured).

In block 504, in the case where the transition is from the ON mode (in which the flash illuminates the scene while the image is captured) to the OFF mode (in which the flash does not illuminate the scene while the image is captured), control passes to block 506. In the case where the transition is not from the ON mode, (in which the flash illuminates the scene while the image is captured) to the OFF mode (in which the flash does not illuminate the scene while the image is captured), control passes to block 508.

At block 506, the first flash mode includes the flash illuminating the scene while capturing each video frame, and in the second flash mode, the flash does not illuminate the scene while the image is captured. The controller 151 causes the flash 101 to gradually decrease the flash duration in each successive frame. For example, the flash duration in five consecutive frames during the transition may be 0.0005 second, 0.0004 second, 0.0003 second, 0.0002 second and 0.0001 second, respectively. This is only one example. The duration of the transition and/or the duration of the individual flashes may be varied.

At block 507, after the completion of the transition, the video capture device operates in the flash OFF mode (the flash does not illuminate the scene during video frame capture).

In block 508, in the case where the transition is from the OFF mode or multiframe mode (the flash does not illuminate the scene during video frame capture) to, control passes to block 510. In the case where the transition is not from the OFF mode or multiframe mode (the flash does not illuminate the scene during video frame capture) to the HDR mode, control passes to block 512.

At block 510, the flash does not illuminate the scene while capturing each video frame in the first flash mode, and the flash illuminating the scene while capturing every second video frame in the second flash mode (alternating flash ON and flash OFF states). The controller 151 causes the flash 101 to gradually increase the flash duration in every second frame. For example, the flash duration during capture of ten consecutive frames during the transition may be 0.0000 second, 0.0001 second, 0.0000 second, 0.0002 second, 0.0000 second, 0.0003 second, 0.0000 second, 0.0004 second, 0.0000 second, and 0.0005 second, respectively. This is only one example. The duration of the transition and the duration of the individual flashes may be varied.

At block 511, after the completion of the transition, the video capture device operates in the HDR mode (with full flash duration in every second frame). The HDR mode includes: capturing pairs of consecutive video frames (each pair of consecutive video frames including: a first video frame for which the flash illuminates the scene, and a second video frame for which the flash does not illuminate the scene), and combining the first video frame and the second video frame to generate an HDR frame.

In block 512, in the case where the transition is from the HDR mode to the OFF mode or multiframe mode (for which the flash does not illuminate the scene during video frame capture), control passes to block 514. In the case where the transition is not from the HDR mode to the OFF mode or multiframe mode (for which the flash does not illuminate the scene during video frame capture), control may pass to a new (e.g., future added) flash operating mode (not shown).

At block 514, in the first flash mode the flash illuminates the scene while capturing every second video frame (alternating flash ON and flash OFF states). In the second flash mode the flash does not illuminate the scene while capturing each video frame (OFF or multiframe mode). The controller 151 causes the flash 101 to gradually decrease the flash duration in every second frame. For example, the flash duration in ten consecutive frames during the transition may be 0.0000 second, 0.0005 second, 0.0000 second, 0.0004 second, 0.0000 second, 0.0003 second, 0.0000 second, 0.0002 second, 0.0000 second, and 0.0001 second, respectively. This is only one example. The duration of the transition and the duration of the individual flashes may be varied.

At block 515, after the completion of the transition, the flash does not illuminate the scene while the video capture device captures video frames in the OFF or multiframe mode. The multiframe mode includes: capturing pairs of consecutive video frames (each pair of consecutive video frames including: a first video frame for which the flash does not illuminate the scene during video frame capture, and a second video frame for which the flash does not illuminate the scene during video frame capture) and combining the first video frame and the second video frame to generate a combined frame having a higher signal-to-noise ratio than respective signal to noise ratios of the first video frame and the second video frame.

Figure 6:
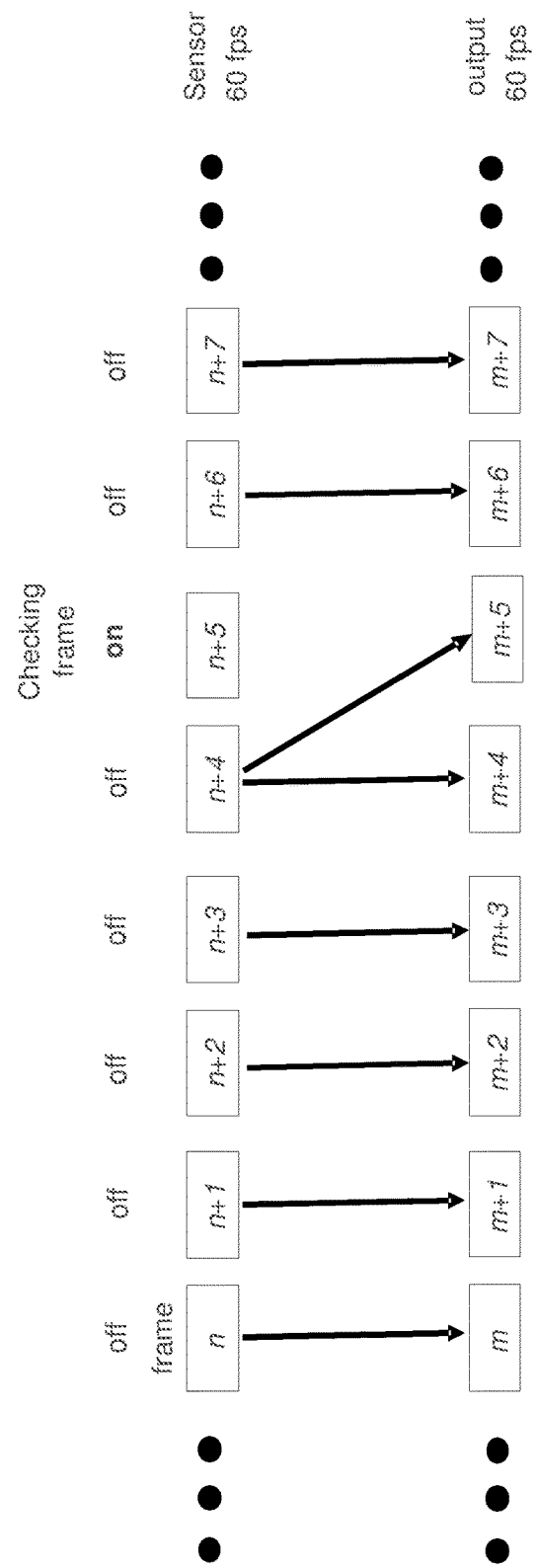
FIG. 6 is a schematic diagram of the method of operating in "flash OFF" mode.

FIG. 6 is a diagram showing the operation of the flash in the OFF mode. In the example of FIG. 6, the video capture device captures a video frame every 1/60 second and outputs a frame (to storage) every 1/60 second. In this example, the number K of regular frames captured before capturing an extra frame to check whether flash illumination improves the image quality is five.

The flash does not illuminate the scene while K input video frames n, n+1, n+2, n+3, and n+4 are captured The K input video frames are output as respective output video frames m, m+1, m+2, m+3, and m+4. The means for initiating capture of an extra frame between two consecutive video frames (discussed above with respect to FIGS. 3 and 4) provides the extra frame n+5 between two consecutive video frames n+4 and n+6.

The flash illuminates the scene while the extra frame n+5 is captured. The controller 151 compares the difference between the image quality of frame n+4 and the image quality of frame n+5 to determine whether flash illumination substantially improves image quality (i.e., whether the difference reaches at least the threshold value). In the example of FIG. 6, the difference is less than the threshold, so the flash does not illuminate the scene while the next K (e.g., 5) frames are captured. To avoid an abrupt change in the output at time n+5, the frame n+5—the flash illuminates the scene while the frame n+5 is captured—is not used in the output frame m+5. Instead, the video frame n+4 is substituted for the output frame m+5 and stored in the storage medium 156, 166 or 168 to provide a smooth light level over time. Thus, when the video is played back, none of the frames will have flash illumination.

The flash does not illuminate the scene while the remaining frames n+6 and n+7 in FIG. 6 are captured, saving the battery capacity.

Figure 7:
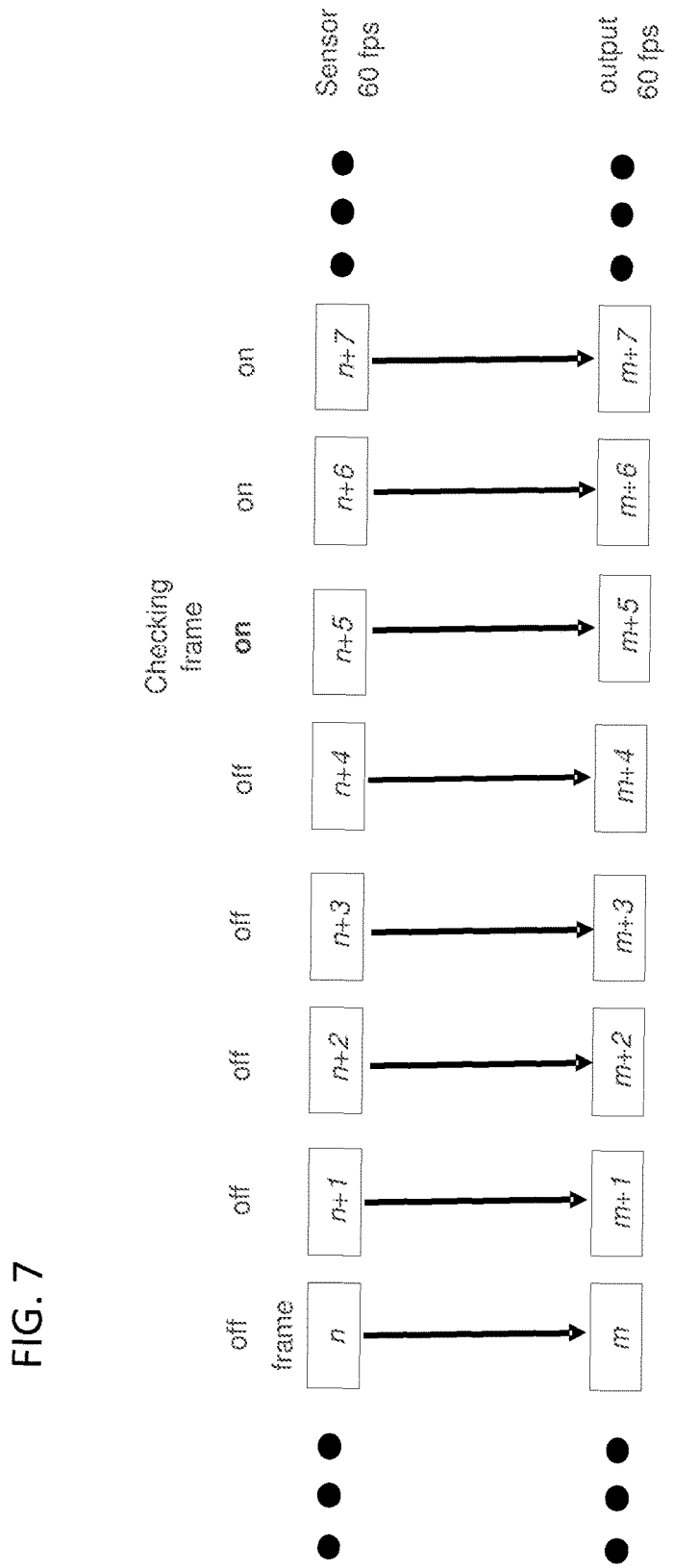
FIG. 7 is a schematic diagram of the method of switching from "flash OFF" mode to "flash ON" mode.

FIG. 7 is a diagram showing the operation of the flash when switching from the OFF mode to the ON mode. In the example of FIG. 7, the video capture device captures a video frame every 1/60 second and outputs a frame (to storage) every 1/60 second. In this example, the number K of regular frames captured before checking whether flash improves the image quality is five.

The flash does not illuminate the scene while the input video frames n, n+1, n+2, n+3, and n+4 are captured. The input video frames n, n+1, n+2, n+3, and n+4 are output as respective output video frames m, m+1, m+2, m+3, and m+4.

The flash illuminates the scene while the next frame n+5 (checking frame) is captured. The checking frame is a frame used for determining the difference in image quality between successive frames where the flash illuminates the scene while one successive frame is captured and the flash does not illuminate the scene while the other successive frame is captured. The controller 151 compares the difference between the image quality of frames n+4 and n+5 to determine whether flash substantially improves image quality (i.e., whether the difference reaches at least the threshold value). In the example of FIG. 7, the difference is greater than or equal to the threshold, so the flash illuminates the scene while the next K (e.g., 5) frames are captured.

In the example of FIG. 7, frames n+4 and n+5 provide two successive frames to support the determination of whether flash illumination improves image quality. The flash does not illuminate the scene while the first successive frame is captured and the flash illuminates the scene while the second successive frame is captured. Thus, no extra frame is captured for the image quality difference calculation. The flash illuminates the scene while frame n+5 is captured. Frame n+5 can be used as the output frame m+5. and the operating state immediately switches from OFF to ON, beginning with frame n+5.

The flash illuminates the scene while the remaining frames n+6 and n+7 in FIG. 6 are captured, to increase image quality.

Figure 8:
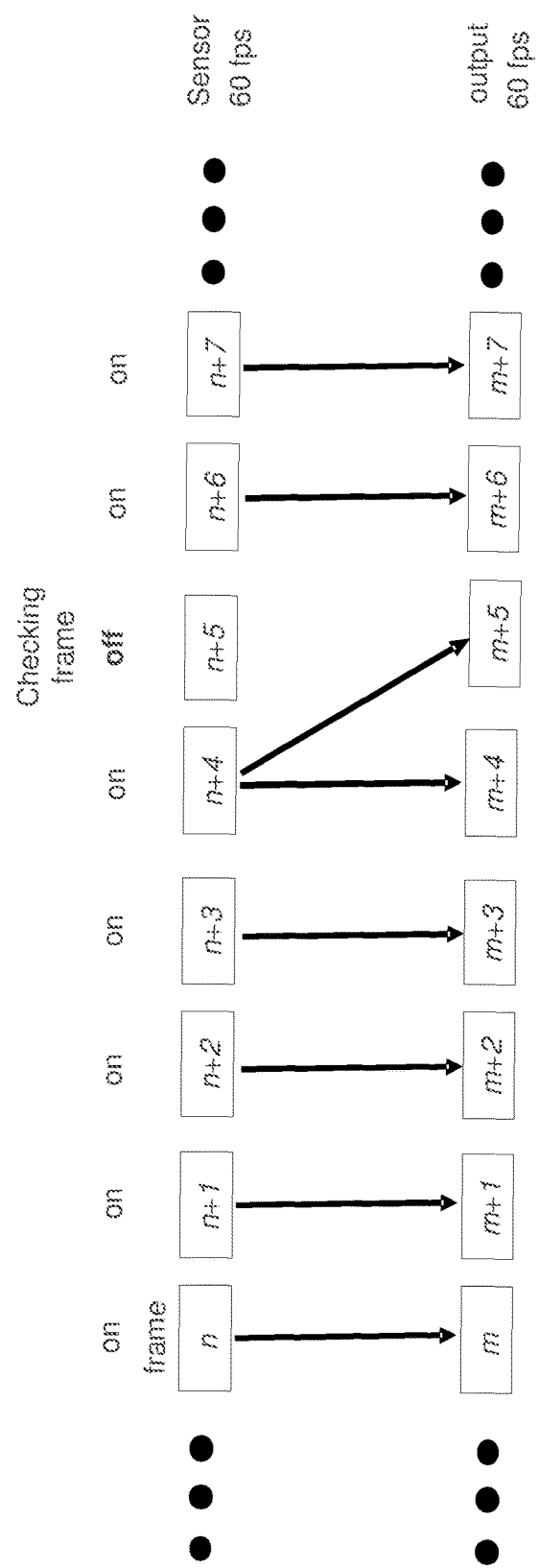
FIG. 8 is a schematic diagram of the method of operating in "flash ON" mode.

FIG. 8 is a diagram showing the operation of the flash in the ON mode. In the example of FIG. 8, the video capture device captures a video frame every 1/60 second and outputs a frame (to storage) every 1/60 second. In this example, the number K of regular frames captured before capturing an extra frame to check whether flash improves the image quality is five.

The flash illuminates the scene while the input video frames n, n+1, n+2, n+3, and n+4 are captured. The input video frames n, n+1, n+2, n+3, and n+4 are output as respective output video frames m, m+1, m+2, m+3, and m+4. The means for initiating capture of an extra frame between two consecutive video frames (discussed above with respect to FIGS. 3 and 4) provides the extra frame n+5 between two consecutive video frames n+4 and n+6.

The flash does not illuminate the scene while the extra frame n+5 (the "checking frame") is captured. The "checking frame" is used for checking whether flash illumination improves the image quality. The checking frame is a frame used for determining the difference in image quality between a first successive frame, for which the flash illuminates the scene, and a second successive frame, for which the flash does not illuminate the scene. The controller 151 compares the difference between the image quality of frames n+4 and n+5 to determine whether flash substantially improves image quality (i.e., whether the difference reaches at least the threshold value). In the example of FIG. 8, the difference is less than the threshold, so the flash illuminates the scene while the next K (e.g., 5) frames are captured. To avoid an abrupt change in the output at time n+5, the flash does not illuminate the scene while the input frame n+5 is captured. The input frame n+5 is not used in the output frame m+5. Instead, the video frame n+4 is substituted for the output frame m+5 and stored to provide a smooth light level over time. Thus, the flash illuminates the respective scene during the capture of every frame that is included when the video is played back.

The flash illuminates the scene while the remaining frames n+6 and n+7 in FIG. 6 are captured. to improve image quality.

Figure 9:
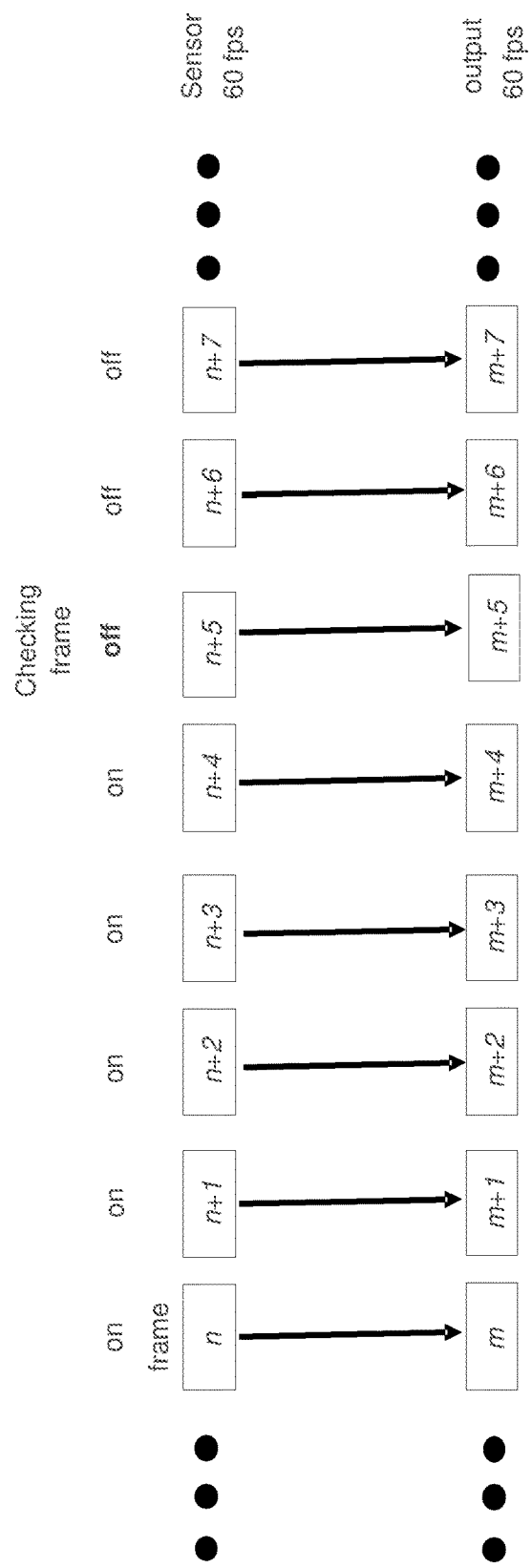
FIG. 9 is a schematic diagram of the method of switching from "flash ON" mode to "flash OFF" mode.

FIG. 9 is a diagram showing the operation of the flash when switching from the ON mode to the OFF mode. In the example of FIG. 9, the video capture device captures a video frame every 1/60 second and outputs a frame (to storage) every 1/60 second. In this example, the number K of regular frames captured before checking whether flash improves the image quality is five.

The flash illuminates the scene while the input video frames n, n+1, n+2, n+3, and n+4 are captured. The input video frames n, n+1, n+2, n+3, and n+4 are output as respective output video frames m, m+1, m+2, m+3, and m+4.

The flash does not illuminate the scene while the next frame n+5 (the checking frame) is captured. The checking frame is used for checking whether flash illumination improves image quality. The controller 151 compares the difference between the respective image qualities of frames n+4 and n+5 to determine whether flash illumination of the scene substantially improves image quality (i.e., whether the difference reaches at least the threshold value). In the example of FIG. 9, the difference is greater than or equal to the threshold, so the flash does not illuminate the scene while the next K (e.g., 5) frames are captured.

In the example of FIG. 9, frames n+4 and n+5 provide two successive frames The flash does not illuminate the scene while the first successive frame is captured, and the flash illuminates the scene while the second successive frame is captured, to support the determination of whether flash illumination improves image quality. Thus, no extra frame is captured for the image quality difference calculation. The flash does not illuminate the scene while the frame n+5 captured is used as the output frame m+5.

The flash does not illuminate the scene while the remaining frames n+6 and n+7 in FIG. 6 are captured, in order to increase the battery discharge time.

Figure 10:
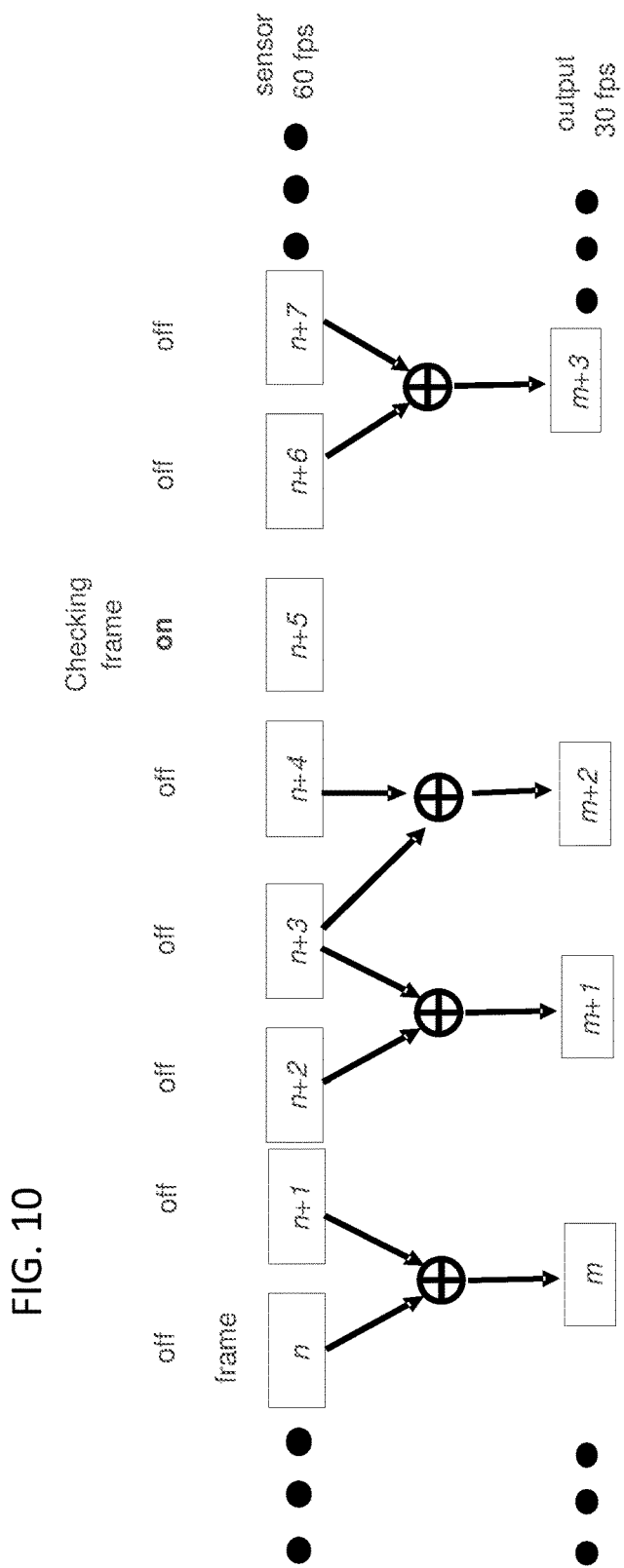
FIG. 10 is a schematic diagram of the method of operating in multiframe mode.

FIG. 10 is a diagram showing the operation of the flash in the multiframe mode. In the example of FIG. 10, the video capture device captures a video frame every $\frac{1}{60}$ second and outputs a frame (to storage) every $\frac{1}{30}$ second.

The flash does not illuminate the scene while the input video frames n, n+1, n+2, n+3, and n+4 are captured. Pairs of successive frames are combined to increase SNR, and are output as respective output video frames m and m+1. The means for initiating capture of an extra frame between two consecutive video frames (discussed above with respect to FIGS. 3 and 4) provides the extra frame n+5 between two consecutive video frames n+4 and n+6.

The flash illuminates the scene while the extra frame n+5 (checking frame) is captured. The controller 151 compares the difference between the image quality of frames n+4 and n+5 to determine whether flash substantially improves image quality (i.e., whether the difference reaches at least the threshold value). In the example of FIG. 10, the difference is less than the threshold, so the flash does not illuminate the scene while the next K frames are captured. To avoid an abrupt change in the output at time n+5, the frame n+5, for which the flash illuminates the scene, is not used in the output frame m+2. Instead, the output frame m+2 is formed by combining the two most recent frames, for which the flash does not illuminate the scene (n+3 and n+4), to provide a smooth light level over time. The frame n+5, for which the flash illuminates the scene, is only used for determining the difference in image quality between frames for which the flash illuminates the scene and frames for which the flash does not illuminate the scene, but frame n+5 does not contribute to any of the output video frames.

The flash does not illuminate the scene while the remaining input frames n+6 and n+7 in FIG. 6 are captured; Input frames n+6 and n+7 are combined to form the output frame m+3 to save the battery capacity.

Although FIG. 10 shows the method in which the output frame rate is 30 frames/second (to extend battery discharge time), in other embodiments, the output frame rate can be higher. For example, the number of frames in the output can be doubled to 60 frames/second by adding an additional output frame between frame m and frame m+1 based on combining frame n+1 with n+2, adding an output frame between frame m+1 and m+2 based on combining frames n+2 and n+4, and adding an output frame between frames m+2 and m+3, based on combining frame n+4 with n+6, and so on.

Figure 11:
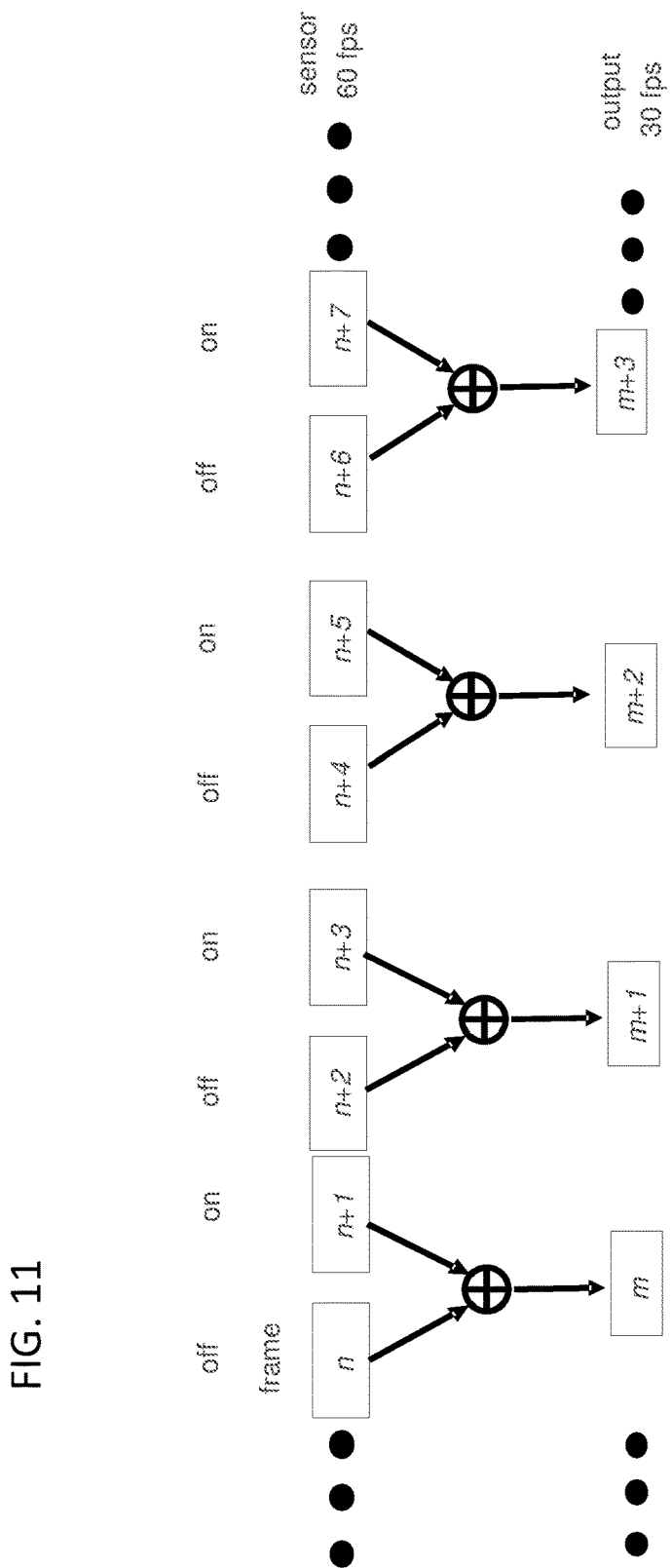
FIG. 11 is a schematic diagram of the method of operating in HDR mode.

FIG. 11 is a diagram showing the operation of the flash in the HDR mode. In the example of FIG. 11, the video capture device captures a video frame every $\frac{1}{60}$ second and outputs a frame (to storage) every $\frac{1}{30}$ second. Each pair of successive video frames includes one frame, for which the flash illuminates the scene during capture, and one frame, for which the flash does not illuminate the scene during capture. In the HDR mode, each pair of successive video frames is suitable for determining the difference between the image quality of images for which the flash illuminates the scene during capture and frames for which the flash does not illuminate the scene during capture, and can serve as the checking frame. Thus, capture of extra frames for determining the difference in image quality between frames for which the flash illuminates the scene during capture and frames for which the flash does not illuminate the scene during capture can be omitted.

The flash does not illuminate the scene while the input video frames n, n+2, n+4, and n+6 are captured, and the flash illuminates the scene while the input video frames n+1, n+3, n+5, and n+7 are captured. Pairs of successive frames are combined to increase dynamic range, and are output as respective output video frames m, m+1, m+2, and m+3.

In one example, the controller 151 compares the difference between the image quality of frames n+4 and n+5 to determine whether flash illumination of the scene substantially improves image quality (i.e., whether the difference reaches at least the threshold value). In the example of FIG. 11, the difference is greater than the threshold, so the next K (e.g., 6) frames are captured in HDR mode turning the flash ON every second frame to provide improved image quality.

Although FIG. 11 shows the method in which the output frame rate is 30 frames/second in other embodiments, the output frame rate can be higher. For example, the number of frames in the output can be doubled to 60 frames/second by adding an additional output frame between frame m and frame m+1 based on combining frame n+1 with n+2, adding an output frame between frame m+1 and m+2 based on combining frames n+3 and n+4, and adding an output frame between frames m+2 and m+3, based on combining frame n+5 with n+6, and so on. Similarly, the output frame rates of the examples shown in FIGS. 12 and 13 (described below) can be doubled by combining the same frames as discussed with respect to FIG. 11.

Figure 12:
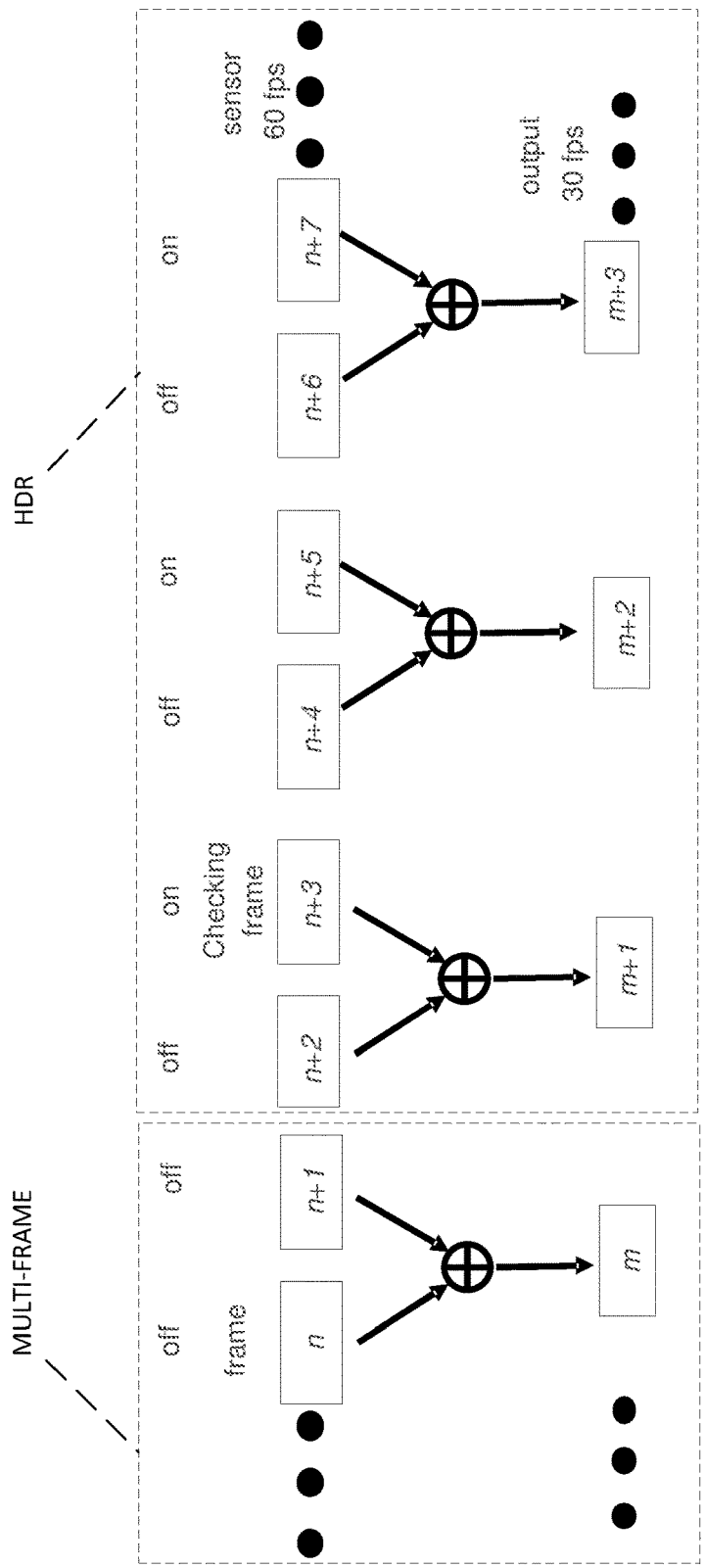
FIG. 12 is a schematic diagram of the method of switching from multiframe mode to HDR mode.

FIG. 12 is a diagram showing the flash being switched from the multiframe mode to the HDR mode. In the example of FIG. 12, the video capture device captures a video frame every $\frac{1}{60}$ second and outputs a frame every $\frac{1}{30}$ second. The flash does not illuminate the scene while the first pair of input frames n, n+1 are captured. The input frames n, n+1 are combined to form a multiframe output frame m. The second pair of input frames include one frame n+2 for which the flash does not illuminate the scene during capture and one checking frame n+3 for which the flash illuminates the scene during capture, suitable for determining whether the difference between the image quality of images captured between frames for which the flash illuminates the scene during capture and frames for which the flash does not illuminate the scene during capture reaches at least the threshold value. In this case, the difference exceeds the threshold value, so the input frames n+2 and n+3 are combined into an HDR output frame m+1, and the operating mode is changed from multiframe to HDR mode. Since frames n+2 and n+3 are suitable for HDR, and the comparison results in a decision to switch to HDR mode, frames n+2 and n+3 can be combined to form the next output frame m+1, and capture of an extra frame for determining the difference in image quality (but not combined into any output image) can be omitted.

After changing from multiframe to HDR mode, flash does not illuminate the scene while the input video frames n+2, n+4, n+6, . . . are captured, and the flash illuminates the scene while the input video frames n+3, n+5, and n+7 are captured. Pairs of successive frames are combined to increase dynamic range, and are output as respective output video frames m+1, m+2, and m+3 to improve image quality.

Figure 13:
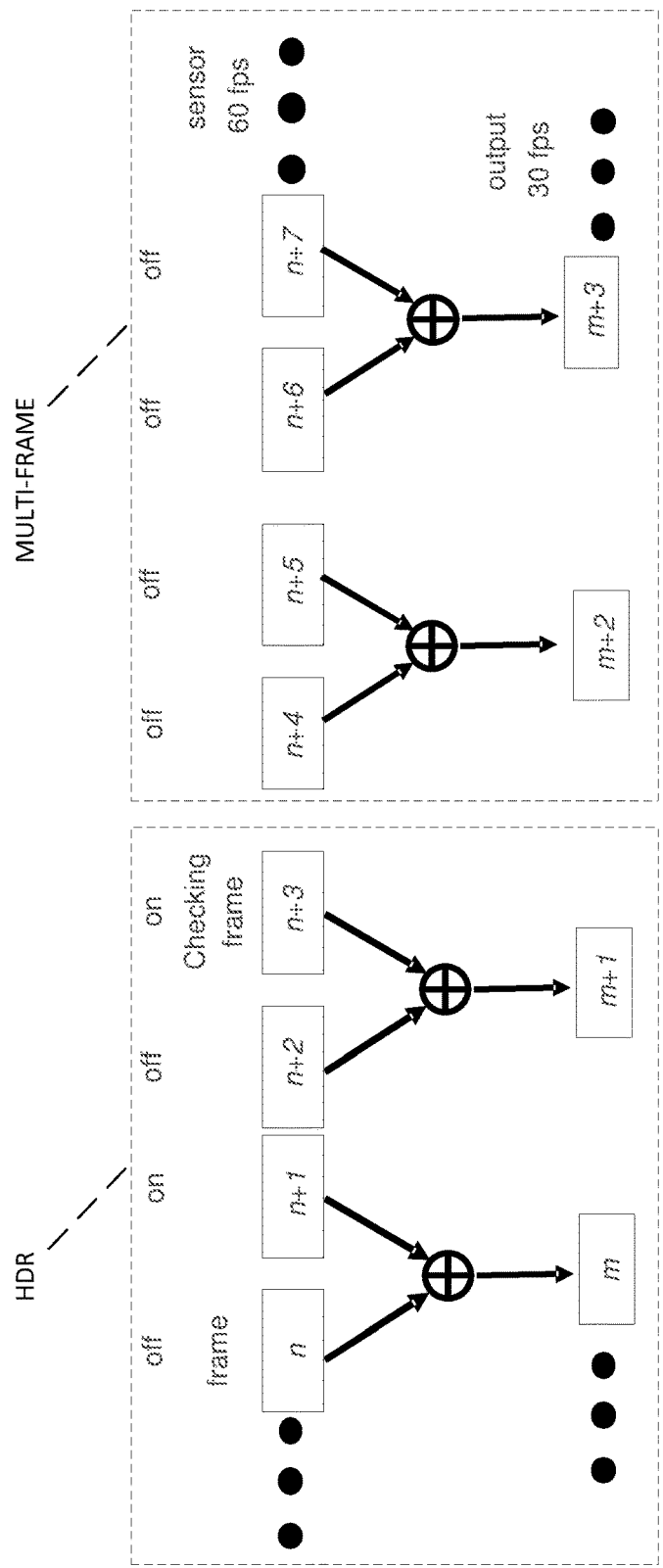
FIG. 13 is a schematic diagram of the method of switching from HDR mode to multiframe mode.

FIG. 13 is a diagram showing the flash being switched from the HDR mode to the multiframe mode. In the example of FIG. 13, the video capture device captures a video frame every ¹⁄₆₀ second and outputs a frame (to storage) every ¹⁄₃₀ second. The flash does not illuminate the scene while the first and third input frames n, n+2, are captured, and the flash illuminates the scene while the second and fourth input frames n+1, n+3 are captured. Each pair of successive video frames are combined to form a respective HDR output frame m, m+1. The second pair of input frames includes one frame for which the flash does not illuminate the scene during capture and one frame for which the flash illuminates the scene during capture. The second pair of input frames is suitable for determining whether the difference between the image quality of images captured while the flash is activated and while the flash is not activated reaches at least the threshold value. Thus, capture of extra frames for determining the difference in image quality between frames for which the flash illuminates the scene during capture and frames for which the flash does not illuminate the scene during capture can be omitted. In this case, the difference in image quality is less than the threshold value, so the video capture device switches from HDR mode to multiframe mode. The following input frames n+4, n+5, n+6 and n+7 are combined into two multiframe output frames m+2, m+3. By switching from HDR mode to multiframe mode, the battery discharge time is increased.

Figure 14:
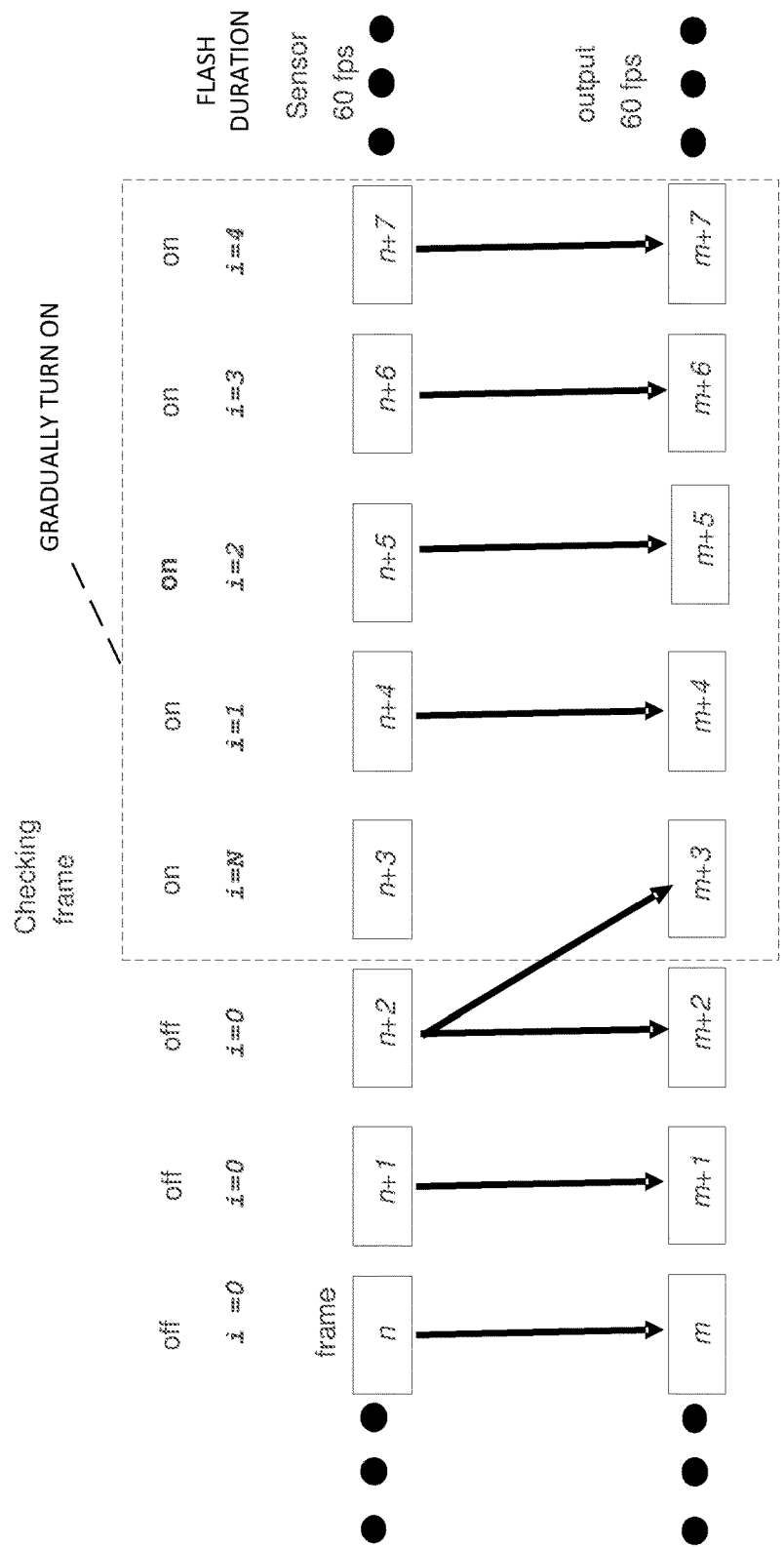
FIG. 14 is a schematic diagram of the method of gradually transitioning from "flash OFF" mode to "flash ON" mode.

FIG. 14 is a diagram showing the activation/deactivation of the flash when gradually transitioning from the OFF mode to the ON mode. In the example of FIG. 14, the video capture device captures a video frame every ¹⁄₆₀ second and outputs a frame (to storage) every ¹⁄₆₀ second.

The flash does not illuminate the scene while the input video frames n, n+1, and n+2 are captured, and frames n, n+1, and n+2 are output as respective output video frames m, m+1, and m+2.

The means for initiating capture of an extra frame between two consecutive video frames (discussed above with respect to FIGS. 3 and 4) provides the extra frame n+3 between two consecutive video frames n+2 and n+4. The extra frame (checking frame) n+3 is captured during continuous flash illumination for the entire ¹⁄₆₀ second that the imaging sensor captures light for frame n+3.

In the example of FIG. 14, frames n+2 and n+3 provide two successive frames. The flash does not illuminate the scene while capturing the first successive frame and the flash illuminates the scene while capturing the second successive frame. The frames n+2 and n+3 can support the determination of whether flash illumination improves image quality. The controller 151 compares the difference between the image quality of frames n+2 and n+3 to determine whether flash illumination of the scene improves image quality substantially (i.e., whether the difference between image quality of frames for which the flash illuminates the scene during capture and frames for which the flash does not illuminate the scene during capture reaches at least the threshold value). In the example of FIG. 14, the difference is greater than or equal to the threshold, so based on the difference, controller 151 determines that the ON-OFF state should gradually transition to the ON state.

In the example, the pixels of the imaging sensor (not shown) integrate charge throughout the ¹⁄₆₀ second period between frames, and the final pixel values are captured. When the flash is in the ON state, the flash illuminates the scene continuously throughout the ¹⁄₆₀ second period between frames. The transition period has a duration of N frames (i.e., the product of N×¹⁄₆₀), wherein N is selected to be larger for a longer, more gradual transition or smaller for a shorter, less gradual transition. For example, the value of N may be in a range from 1 to 240, corresponding to transition duration from ¹⁄₆₀ second to 4 seconds. To gradually increase the flash illumination, the flash is turned on for increasing lengths of time from 0.0 second (continually OFF) to ¹⁄₆₀ second (continually on). Thus, the duration T of the flash illumination in each of the N frames can be selected as:

$$T = i/60N$$

wherein i varies from 1 to N during the transition. For a uniform transition, i is increased arithmetically as i=1, 2, 3, . . . , N. In some embodiments, the value of N is selectable, or the user is provided the capability to select transition times corresponding to respectively different values of N.

In the checking frame n+3, i is set to N. The checking frame is a frame used for determining the difference in image quality between successive frames for which the flash illuminates the scene during capture and successive frames for which the flash does not illuminate the scene during capture. That is, the flash illumination is turned ON throughout the entire ¹⁄₆₀ second while the extra frame n+3 is being captured. To avoid an abrupt change in illumination in the output frame m+3, the fully illuminated input frame n+3 is only used for calculating the difference in image quality (due to flash), but is not combined into the output frame m+3. Instead, the input frame n+2 is output twice, in output frames m+2 and m+3. During the subsequent frames n+4, n+5, n+6 and n+7, i varies from 1 to 4, respectively, and the flash duration varies from ¹⁄₆₀N to ⁴⁄₆₀N, respectively. For example, if N is 10, then frames n+4 to n+13 have flash durations of ¹⁄₆₀₀, ²⁄₆₀₀, ³⁄₆₀₀, . . . , ¹⁰⁄₆₀₀, respectively, and the flash remains on continuously beginning with frame n+13.

Figure 15:
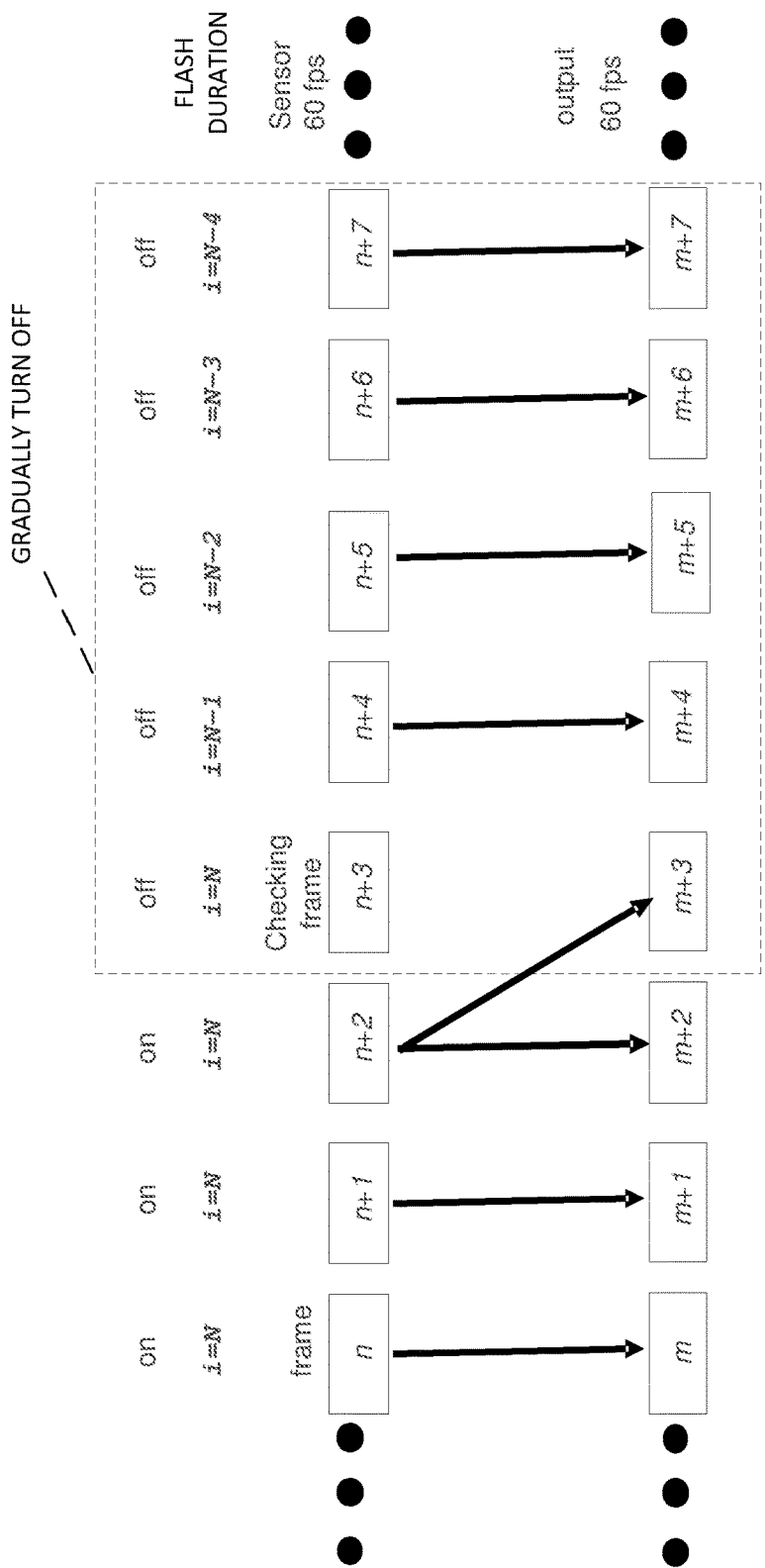
FIG. 15 is a schematic diagram of the method of gradually transitioning from "flash ON" mode to "flash OFF" mode.

FIG. 15 is a diagram showing the activation/deactivation of the flash when gradually transitioning from the ON mode to the OFF mode. In the example of FIG. 15, the video capture device captures a video frame every ¹⁄₆₀ second and outputs a frame (to storage) every ¹⁄₆₀ second.

The input video frames n, n+1, n+2, and n+3 are captured with continuous flash, and are output as respective output video frames m, m+1, and m+2. As shown, while capturing video frames n, n+1, n+2, and n+3, the index i=N, meaning that the flash duration is N/60N=¹⁄₆₀ second, which is the full duration of a frame.

The means for initiating capture of an extra frame between two consecutive video frames (discussed above with respect to FIGS. 3 and 4) provides the extra frame n+3 between two consecutive video frames n+2 and n+4. The flash does not illuminate the scene while the extra frame (checking frame) n+3 is captured. The controller 151 compares the difference between the image quality of frames n+2 and n+3 to determine whether flash illumination of the scene during capture substantially improves image quality (i.e., whether the difference reaches at least the threshold value). In the example of FIG. 15, the difference is less than the threshold, so the flash is gradually turned OFF over the next N frames, each frame being captured over a ¹⁄₆₀ second period.

In the example of FIG. 15, the value of N may be in a range from 1 to 240, corresponding to transition duration from ¹⁄₆₀ second to 4 seconds. To gradually decrease the flash illumination, the flash is turned ON for decreasing lengths of time from 1/60 second (continually ON) to 0.0 second (continually OFF). Thus, the duration T of the flash illumination in each of the N frames can be selected as:

$$T = i/60N$$

wherein i takes the values N, N−1, N−2, . . . , 0.

In the checking frame n+3, i is set to 0.0. That is, the flash illumination is turned OFF for the entire 1/60 second while the extra frame n+3 is being captured. To avoid an abrupt change in illumination in the output frame m+3, the input frame n+3 (for which the flash does not illuminate the scene during capture) is only used for calculating the difference in image quality (due to flash illumination of the scene during capture), but is not output as frame m+3. Instead, the input frame n+2 is output twice, in output frames m+2 and m+3. During the subsequent frames n+4, n+5, n+6 and n+7, i varies from N−1 to N−4, respectively, and the flash duration varies from (N−1)/60N to (N−4)/60N, respectively. For example, if N is 10, then frames n+4 to n+13 have flash durations of 9/600, 8/600, 7/600, . . . , 0/600, respectively, and the flash remains OFF continuously beginning with frame n+13.

Figure 16:
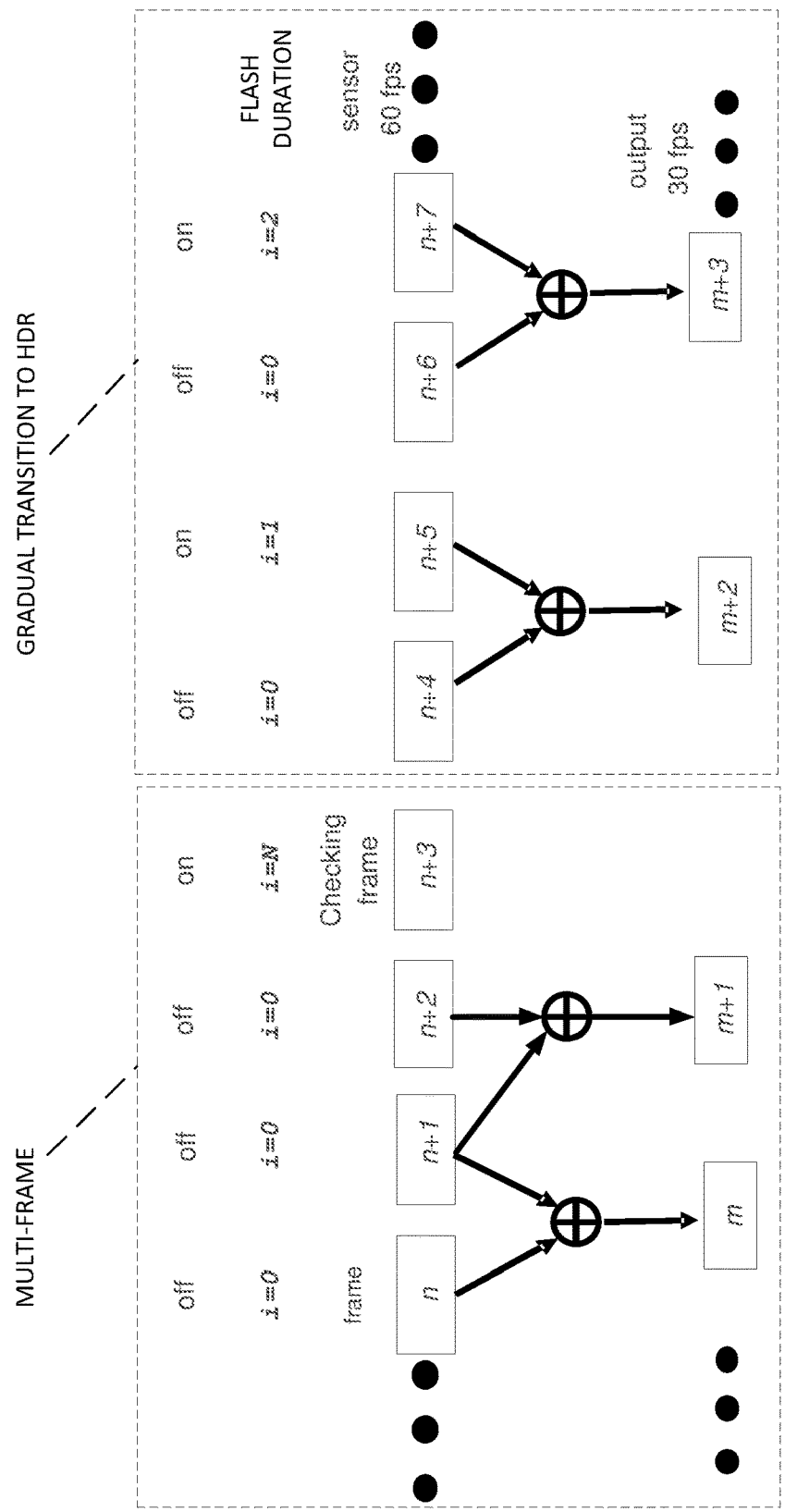
FIG. 16 is a schematic diagram of the method of gradually transitioning from multiframe mode to HDR mode.

FIG. 16 is a diagram showing the flash being gradually transitioned from the multiframe mode to the HDR mode. In the example of FIG. 16, the video capture device captures a video frame every 1/60 second and outputs a frame every 1/30 second. The flash does not illuminate the scene while the first pair of input frames n, n+1 are captured, and frames n and n+1 are combined to form a multiframe output frame m. The means for initiating capture of an extra frame between two consecutive video frames (discussed above with respect to FIGS. 3 and 4) provides the extra frame n+3 between two consecutive video frames n+2 and n+4. The second pair of input frames include one frame n+2 (for which the flash does not illuminate the scene during capture) and an extra frame n+3 (checking frame) for which the flash illuminates the scene during capture. The checking frame (extra frame n+3) is suitable for determining whether the difference (between the image quality of images for which flash illuminates the scene during capture and images for which the flash does not illuminate the scene during capture) reaches at least the threshold value. In this case, the difference exceeds the threshold value, so the operating mode is changed from multiframe to HDR mode. Although frames n+2 and n+3 are suitable for HDR, the extra frame n+3 is illuminated by flash throughout capture of frame n+3, and the embodiment of FIG. 16 gradually transitions to the HDR, instead of switching instantly. In one example, to avoid a sudden change in flash illumination, the two most recent frames n+1 and n+2 for which the flash does not illuminate the scene during capture are combined to generate the multiframe output frame m+1, and input frame n+3 is not used for forming any of the output frames, as shown in FIG. 16.

As in the examples of FIGS. 14 and 15, the transition in FIG. 16 is performed gradually over N frames. After changing from multiframe to HDR mode, the flash does not illuminate the scene while the input video frames n+4, n+6, n+8, . . . are captured, and the flash illuminates the scene with increasing flash duration while the input video frames n+5, n+7, n+9, . . . are captured. Pairs of successive frames are combined to increase dynamic range, and are output as respective output video frames m+2, m+3, m+4, . . . to improve image quality. For an input rate of 60 frames/second, the flash duration during frames n+5, n+7, n+9, . . . are given by i/60N, where i=1, 2, 3, . . . , N, respectively. That is, the flash duration during frames n+5, n+7, n+9, . . . is given by T=1/60N, 2/60N, 3/60N, . . . , N/60N, respectively.

Although FIG. 16 shows the method in which the output frame rate is 30 frames/second in other embodiments, the output frame rate can be higher. For example, the number of frames in the output can be doubled to 60 frames/second by adding an additional output frame between frame m and frame m+1 based on combining frame n with n+2, adding an output frame between frame m+1 and m+2 based on combining frames n+3 and n+4, and adding an output frame between frames m+2 and m+3, based on combining frame n+5 with n+6, and so on. Similarly, the output frame rates of the examples shown in FIG. 17 (described below) can be doubled by combining the same frames as discussed with respect to FIG. 16.

Figure 17:
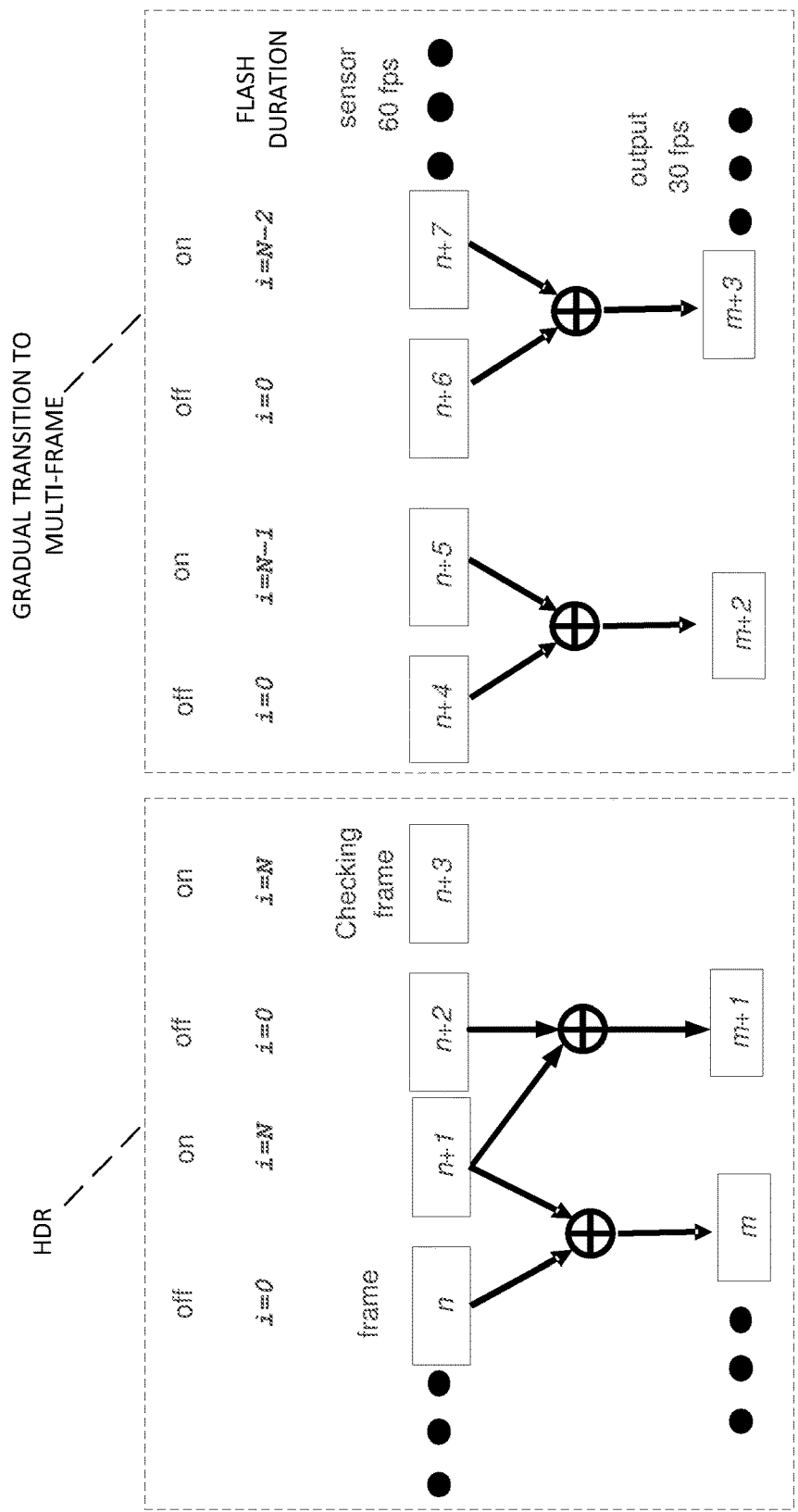
FIG. 17 is a schematic diagram of the method of gradually transitioning from HDR mode to multiframe mode.

FIG. 17 is a diagram showing the flash being gradually transitioned from the HDR mode to the multiframe mode. In the example of FIG. 17, the video capture device captures a video frame every 1/60 second and outputs a frame (to storage) every 1/30 second. The flash does not illuminate the scene while the first and third input frames n, n+2, are captured, and the flash illuminates the scene while the second and fourth input frames n+1, n+3 are captured. Each of the first two pairs of successive video frames can be combined to form a respective HDR output frame m, m+1. Alternatively, as shown in FIG. 17, frame n+1 can be combined with frame n to form the first output frame m and also can be combined with frame n+2 to form the second output frame m+1. If frame n+1 is used for both of the first two output frames, the checking frame n+3 may be an extra frame used for determining the difference in image quality (between flash ON and flash OFF), but not used to generate any output frame.

Each of the first two pairs of input frames includes one frame for which the flash does not illuminate the scene during capture and one frame for which the flash illuminates the scene during capture. The first two pairs of input frames are also suitable for determining whether the difference (between the image quality of images for which the flash illuminates the scene during capture and images for which the flash does not illuminate the scene during capture) reaches at least the threshold value. In this example, the difference based on comparison of frames n+2 and n+3 is less than the threshold value, so the video capture device gradually transitions from HDR mode to multiframe mode. The input frames n+4, n+5, n+6 and n+7 are combined into two output frames m+2, m+3. By gradually transitioning from HDR mode to multiframe mode, the battery discharge time is increased without introducing sudden lighting change detectable by the naked eye.

As shown in FIG. 17, the flash duration T for frames n+5, n+7, n+9, are given by T=i/60N, where i=N−1, i=N−2, i=N−3, . . . , respectively, and 2*N is the number of output frames in the transition. During the transition, the flash duration T for frames n+5, n+7, n+9, . . . is (N−1)/60N, (N−2)/60N, (N−3)/60N, . . . , respectively. Beginning with the 2*N$^{th}$ transition frame, the flash is turned OFF for the full duration of every second video frame. Meanwhile, both during and after the transition, the frames n+4, n+6, n+8, . . . are shot without any flash.

The methods described above are only exemplary. Other embodiments can switch between (or provide gradual transitions between) additional flash operating modes, such as variable flash duty cycle modes, additional combinations of one or more images for which the flash illuminates the scene during capture and one or more images for which the flash does not illuminate the scene during capture, or the like. For example, in one embodiment, the image quality of each flash frame during a gradual transition to HDR mode is determined (where each flash frame during the transition has a different flash duration, as described in FIG. 16). The transition stops when the video frame having a maximum image quality is found (i.e., when longer flash duration begins to reduce image quality. Then the flash can be operated in HDR mode, such that the video frames having flash illumination use the flash duty cycle with the maximum image quality. Using a shorter flash duty cycle in the HDR mode can further increase battery discharge time.

The flash control methods described herein provide flash illumination of the scene during video capture when flash illumination can improve video quality, and turns the flash OFF to preserve battery capacity, when flash illumination does not improve video quality. Battery discharge time can be extended without compromising image quality. The methods can also provide gradual transition between flash modes, to avoid sudden changes in light levels of the captured video.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Although the subject matter has been described in terms of exemplary embodiments, it is not limited thereto. Rather, the appended claims should be construed broadly, to include other embodiments, variants, and equivalents, which may be made by those skilled in the art.

What is claimed is:

1. A controller for selectively activating an illumination source, the controller including a processor in communication with a memory configured to store a sequence of video frames, the controller configured to:
    selectively activate an illumination source during capture of two successive video frames in a video capture session, so that the illumination source illuminates a scene while a video capture device is capturing one of the successive video frames, and the illumination source does not illuminate the scene while the video capture device is capturing the other of the two successive video frames;
    determine whether a difference in image quality between the two successive video frames reaches at least a threshold difference; and
    based on the determination of whether the difference in image quality reaches the threshold difference, determine whether to activate or deactivate the illumination source while capturing subsequent video frames during the video capture session.

2. The controller according to claim 1, wherein the controller is further configured to activate the illumination source to illuminate the scene during capture of additional video frames in response to determining that the difference in image quality between the two successive video frames reaches at least the threshold difference.

3. The controller of claim 1, wherein the controller is further configured to deactivate the illumination source so the illumination source does not illuminate the scene during capture of at least two further video frames, in response to determining that the difference in image quality between the two successive video frames is less than the threshold difference.

4. The controller of claim 1, wherein the controller is further configured to:
    initiate capture of an extra frame between two consecutive video frames, and
    determine the difference based on the extra frame and one of the two consecutive video frames.

5. The controller of claim 1, wherein the controller is included in a video capture system comprising:
    a video capture device capable of capturing video frames at a predetermined frame rate; and
    the illumination source.

6. The controller of claim 1, wherein the controller is further configured to:
    deactivate the illumination source while operating the video capture device in a multiframe mode;
    selectively activate the illumination source during alternating video frames while operating the video capture device in a high dynamic range (HDR) mode; and
    initiate a change between operating the video capture device in the multiframe mode and operating the video capture device in the HDR mode based on the difference.

7. The controller of claim 1, wherein the controller is further configured to gradually increase or decrease a flash duration of the illumination source during a transition between operating the video capture device in a first flash mode and operating the video capture device in a second flash mode.

8. The controller of claim 7, wherein:
    the first flash mode includes activating the illumination source for illuminating the scene while capturing each video frame, and
    the second flash mode includes deactivating the illumination source so as not to illuminate the scene while capturing each video frame.

9. The controller of claim 7, wherein:
    the first flash mode includes selectively activating the illumination source while capturing alternating video frames in a high dynamic range (HDR) mode, and
    the second flash mode includes deactivating the illumination source while capturing video frames in a multiframe mode.

10. The controller of claim 9, wherein the HDR mode includes:
    capturing pairs of consecutive video frames, each pair of consecutive video frames including:
        a first video frame, wherein the illumination source illuminates the scene while the first video frame is captured, and a second video frame, wherein the illumination source
does not illuminate the scene while the second video
frame is captured; and
combining the first video frame and the second video
frame to generate an HDR frame.

11. The controller of claim 9, wherein the multiframe mode includes:
capturing pairs of consecutive video frames, each pair of consecutive video frames including:
a first video frame, wherein the illumination source does not illuminate the scene while the first video frame is captured, and
a second video frame, wherein the illumination source illuminates the scene while the second video frame is captured; and
combining the first video frame and the second video frame to generate a combined frame having a higher signal-to-noise ratio than respective signal to noise ratios of the first video frame and the second video frame.

12. The controller of claim 1, wherein the controller is configured to repeat the selectively activating, the determining whether the difference in image quality reaches the threshold difference, and the determining whether to activate or deactivate the illumination source, after at least two additional video frames are captured.

13. A method for controlling activation of an illumination source, comprising:
selectively activating an illumination source during capture of two successive video frames in a video capture session, so that the illumination source illuminates a scene while one of the successive video frames is captured, and the illumination source does not illuminate the scene while the other of the two successive video frames is captured;
determining whether a difference in image quality between the two successive video frames reaches at least a threshold difference; and
based on the determination of whether the difference in image quality reaches the threshold difference, determine whether to activate or deactivate the illumination source while capturing subsequent video frames during the video capture session.

14. The method for controlling activation of an illumination source of claim 13, further comprising activating the illumination source to illuminate the scene during capture of at least two additional video frames in response to determining that the difference in image quality between the two successive video frames reaches at least the threshold difference.

15. The method for controlling activation of an illumination source of claim 13, further comprising deactivating the illumination source, so the illumination source does not illuminate the scene during capture of at least two further video frames in response to determining that the difference in image quality between the two successive video frames is less than the threshold difference.

16. The method for controlling activation of an illumination source of claim 13, wherein the method further comprises:
initiating capture of an extra frame between two consecutive video frames, and
determining the difference based on the extra frame and one of the two consecutive video frames.

17. The method for controlling activation of an illumination source of claim 13, further comprising:
deactivating the illumination source to operate the video capture device in a multiframe mode;
selectively activating the illumination source during every second video frame to operate the video capture device in a high dynamic range (HDR) mode; and
initiating a change between operating the video capture device in the multiframe mode and operating the video capture device in the HDR mode, based on the difference.

18. The method for controlling activation of an illumination source of claim 13, further comprising gradually increasing or decreasing a flash duration of the illumination source during a transition between operating the video capture device in a first flash mode and operating the video capture device in a second flash mode.

19. The method for controlling activation of an illumination source of claim 18, wherein:
the first flash mode includes illuminating the scene by the illumination source while capturing each video frame, and
the second flash mode includes deactivating the illumination source while capturing each video frame.

20. The method for controlling activation of an illumination source of claim 18, wherein:
the first flash mode includes selectively activating the illumination source while capturing alternating video frames in a high dynamic range (HDR) mode, and
the second flash mode includes deactivating the illumination source while capturing video frames in a multiframe mode.

21. The method for controlling activation of an illumination source of claim 20, wherein the HDR mode includes:
capturing pairs of consecutive video frames, each pair of consecutive video frames including:
a first video frame, wherein the illumination source illuminates the scene while the first video frame is captured, and
a second video frame, wherein the illumination source does not illuminate the scene while the second video frame is captured; and
combining the first video frame and the second video frame to generate an HDR frame.

22. The method for controlling activation of an illumination source of claim 20, wherein the multiframe mode includes:
capturing pairs of consecutive video frames, each pair of consecutive video frames including:
a first video, wherein the illumination source does not illuminate the scene while the first video frame is captured, and
a second video, wherein the illumination source illuminates the scene while the second video frame is captured; and
combining the first video frame and the second video frame to generate a combined frame having a higher signal-to-noise ratio than respective signal to noise ratios of the first video frame and the second video frame.

23. The method for controlling activation of an illumination source of claim 13, further comprising repeating the selectively operating, the determining whether the difference in image quality reaches the threshold difference, and the determining whether to activate or deactivate the illumination source, after at least two additional video frames are captured.

24. A controller for an illumination source, comprising:
   means for selectively activating a means for illuminating a scene during capture of two successive video frames, so that the means for illuminating illuminates the scene while one of the successive video frames is captured, and the means for illuminating does not illuminate the scene while the other of the two successive video frames is captured;
   means for determining whether a difference in image quality between the two successive video frames reaches at least a threshold difference; and
   means for determining whether to activate or deactivate the means for illuminating a scene while capturing subsequent video frames during a video capture session based on the determination of whether the difference in image quality reaches the threshold difference.

25. The controller for an illumination source of claim 24, further comprising means for activating the means for illuminating during capture of at least two additional video frames in response to determining that the difference in image quality between the two successive video frames reaches at least the threshold difference.

26. The controller for an illumination source of claim 24, further comprising means for deactivating the means for illuminating during capture of at least two further video frames in response to determining that the difference in image quality between the two successive video frames is less than the threshold difference.

27. The controller for an illumination source of claim 24, further comprising:
   means for initiating capture of an extra frame between two consecutive video frames, and
   means for determining the difference based on the extra frame and one of the two consecutive video frames.

28. The controller for an illumination source of claim 24, further comprising:
   means for deactivating the means for illuminating while operating the video capture device in a multiframe mode;
   means for selectively activating the means for illuminating while operating the video capture device in a high dynamic range (HDR) mode; and
   means for initiating a change between operating the video capture device in the multiframe mode and operating the video capture device in the HDR mode based on the difference.

29. The controller for an illumination source of claim 24, further comprising means for gradually increasing or decreasing a flash duration of the means for illuminating during a transition between operating the video capture device in a first flash mode and operating the video capture device in a second flash mode.

30. A non-transitory, machine readable storage medium encoded with program instructions, such that when accessed and executed by a processor, the instructions cause the processor to perform a method for controlling activation of an illumination source, comprising:
   selectively operating an illumination source during capture of two successive video frames using a video capture device, so that the illumination source illuminates a scene while one of the successive video frames is captured, and the illumination source does not illuminate the scene while the other of the two successive video frames is captured;
   determining whether a difference in image quality between the two successive video frames reaches at least a threshold difference; and
   based on the determination of whether the difference in image quality reaches the threshold difference, determining whether to activate or deactivate the illumination source while capturing subsequent video frames during the video capture session.

* * * * *